US010229148B1

(12) United States Patent
Nguyen et al.

(10) Patent No.: US 10,229,148 B1
(45) Date of Patent: Mar. 12, 2019

(54) MULTI-LANGUAGE SUPPORT FOR INTERFACING WITH DISTRIBUTED DATA

(71) Applicant: Arimo, Inc., Mountain View, CA (US)

(72) Inventors: Christopher T. Nguyen, Los Altos, CA (US); Anh H. Trinh, Milpitas, CA (US); Bach D. Bui, Milpitas, CA (US)

(73) Assignee: ARIMO, INC., Mountain View, CA (US)

( * ) Notice: Subject to any disclaimer, the term of this patent is extended or adjusted under 35 U.S.C. 154(b) by 689 days.

(21) Appl. No.: 14/814,457

(22) Filed: Jul. 30, 2015

Related U.S. Application Data

(60) Provisional application No. 62/086,158, filed on Dec. 1, 2014.

(51) Int. Cl.
G06F 17/30 (2006.01)
G06F 8/30 (2018.01)

(52) U.S. Cl.
CPC ........ *G06F 17/30345* (2013.01); *G06F 8/315* (2013.01); *G06F 17/3061* (2013.01); *G06F 17/30342* (2013.01); *G06F 17/30876* (2013.01)

(58) Field of Classification Search
CPC ......... G06F 17/30342; G06F 17/30876; G06F 17/3061; G06F 8/315; G06F 17/30345
See application file for complete search history.

(56) References Cited

U.S. PATENT DOCUMENTS

| 8,024,361 | B2 | 9/2011 | Daughtry |
| 8,069,188 | B2 | 11/2011 | Larson et al. |
| 8,326,848 | B2 | 12/2012 | Dettinger et al. |
| 8,407,322 | B1 * | 3/2013 | Sasikumar ............ G06F 8/4441 709/220 |
| 8,677,091 | B2 | 3/2014 | Littlefield et al. |
| 8,990,235 | B2 | 3/2015 | King et al. |
| 9,529,785 | B2 | 12/2016 | Vagell et al. |
| 9,686,086 | B1 * | 6/2017 | Nguyen ............. H04L 12/1822 |
| 9,807,073 | B1 | 10/2017 | Miller |

(Continued)

OTHER PUBLICATIONS

Juneau et al. "The Definitive Guide to Jython", 2010, Apress.*

(Continued)

*Primary Examiner* — Rehana Perveen
*Assistant Examiner* — Huen Wong
(74) *Attorney, Agent, or Firm* — Fenwick & West LLP

(57) ABSTRACT

A data analysis system stores in-memory representation of a distributed data structure across a plurality of processors of a parallel or distributed system. Client applications interact with the in-memory distributed data structure to process queries using the in-memory distributed data structure and to modify the in-memory distributed data structure. The data analysis system creates uniform resource identifier (URI) to identify each in-memory distributed data structure. The URI can be communicated from one client application to another application using communication mechanisms outside the data analysis system, for example, by email, thereby allowing other client devices to interact with a particular in-memory distributed data structure. The in-memory distributed data structure can be a machine learning model that is trained by one client device and executed by another client device. A client application can interact with the in-memory distributed data structure using different programming languages.

19 Claims, 14 Drawing Sheets

(56) References Cited

U.S. PATENT DOCUMENTS

| | | |
|---|---|---|
| 2005/0256890 A1 | 11/2005 | Rajasekaran et al. |
| 2008/0243807 A1 | 10/2008 | Gaucas et al. |
| 2013/0091461 A1 | 4/2013 | Srgo et al. |
| 2013/0138739 A1 | 5/2013 | Uppal |
| 2014/0181085 A1 | 6/2014 | Gokhale et al. |
| 2016/0065546 A1 | 3/2016 | Krishna |

OTHER PUBLICATIONS

Schreiber, "Mixing Python and Java", 2009, German Aerospace Center.*

Noel et al., "Jython Essentials", 2002, OReilly.*

Bottou, L., "Large-Scale Machine Learning with Stochastic Gradient Descent." Proceedings of the 19th International Conference on Computational Statistics (COMPSTAT'2010), 2010, Y. Lechevallier et al. (eds.), pp. 177-187.

Breiman, L., "Random Forests." Machine Learning, 2001, pp. 5-32, vol. 45, No. 1.

Chen, S. et al., "Map-Reduce Meets Wider Varieties of Applications," Intel Corporation, 2008, 8 pages.

Livingston, F., "Implementation of Breiman's Random Forest Machine Learning Algorithm," ECE591Q Machine Learning Journal Paper, Fall 2005, 13 pages.

Sun, Y. et al., "Articulate: A Conversational Interface for Visual Analytics," IEEE Symposium on Visual Analytics Science and Technology, 2009, 2 pages.

Sun, Y. et al., "Articulate: A Semi-Automated Model for Translating Natural Language Queries into Meaningful Visualizations," SG 2010, LNCS 6133, R. Taylor et al. (eds.), 2010, pp. 184-195.

Sun, Y., "Articulate: Creating Meaningful Visualizations from Natural Language," PhD Thesis, University of Illinois at Chicago, 2012, 105 pages.

Torfs, P. et al., "A (Very) Short Introduction to R," Hydrology and Quantitative Water.

Management Group, Wageningen University, The Netherlands, Mar. 3, 2014, pp. 1-12.

Wickham, H., "The Split-Apply-Combine Strategy for Data Analysis". Journal of Statistical Software, Apr. 2011, pp. 1-29, vol. 40, Issue 1.

Zaharia, M. et al., "Resilient Distributed Datasets: A Fault-Tolerant Abstractions for In-Memory Cluster Computing," [Proceedings of the 9th USENIX Conference on Networked Systems Design and Implementation, 2012, 14 pages.

"Feature Scaling," Wikipedia®, Last Modified Dec. 21, 2015, 3 pages, [Online] [Retrieved on Jan. 27, 2016] Retrieved from the Internet<URL:http://en.wikipedia.org/wiki/Feature_scaling>.

"Sybase®: Coral8 CCL Reference," Sybase, Inc., May 2009, 317 pages.

* cited by examiner

MULTI-LANGUAGE SUPPORT FOR INTERFACING WITH DISTRIBUTED DATA

CROSS REFERENCE TO RELATED APPLICATIONS

This application claims the benefits of U.S. Provisional Application No. 62/086,158 filed on Dec. 1, 2014, which is incorporated by reference in its entirety.

BACKGROUND

The disclosure relates to efficient processing of large data sets using parallel and distributed systems. More specifically, the disclosure concerns various aspects of processing of distributed data structures including collaborative processing of distributed data structures using shared documents.

Enterprises produce large amount of data based on their daily activities. This data is stored in a distributed fashion among a large number of computer systems. For example, large amount of information is stored as logs of various systems of the enterprise. Processing such large amount of data to gain meaningful insights into the information describing the enterprise requires large amount of resources. Furthermore, conventional techniques available for processing such large amount of data typically require users to perform cumbersome programming.

Furthermore, users have to deal with complex systems that perform parallel/distributed programming to be able to process such large amount of data. Software developers and programmers (also referred to as data engineers) who are experts at programming and using such complex systems typically do not have the knowledge of a business expert or a data scientist to be able to identify the requirements for the analysis. Nor are the software developers able to analyze the results on their own.

As a result, there is a gap between the process of identifying requirements and analyzing results and the process of programming the parallel/distributed systems to achieve the results. This gap results in time consuming communications between the business experts/data scientists and the data engineers. Data scientists, business experts, as well as data engineers act as resources of an enterprise. As a result the above gap adds significant costs to the process of data analysis. Furthermore, this gap leads to possibilities of errors in the analysis since a data engineer can misinterpret certain requirements and may generate incorrect results. The business experts or the data scientists do not have the time or the expertise to verify the software developed by the developers to verify its accuracy.

Some tools and systems are available to assist data scientists and business experts with the above process of providing requirements and analyzing results of big data analysis. The tools and systems used by data scientists are typically difficult for business experts to use and tools and systems used by business experts are difficult for data scientists to use. This creates another gap between the analysis performed by data scientists and the analysis performed by business experts. Therefore conventional techniques for providing insights into big data stored in distributed systems of an enterprise fail to provide suitable interface for users to analyze the information available in the enterprise.

SUMMARY

Embodiments support multi-language support for data processing. A system stores an in-memory distributed data frame structure (DDF) across a plurality of compute nodes. Each compute node stores a portion of the in-memory distributed data structure (DDF segment). The data of the DDF conforms to a primary language. The system further stores a document comprising text and code blocks. The code blocks comprise a first code block for providing instructions using the primary language and a second code block for providing instructions using a secondary language.

The system receives a request to process instructions specified in the first code block using the primary language. Each compute node processes the instructions to process the DDF segment mapped to the compute node. The system further receives a request to process instructions specified in the second code block using the secondary language. Each compute node transforms the data of the DDF segment mapped to the compute node to conform to the format of the secondary language. Each compute node executes the instructions of the secondary language to generate a result DDF segment. The system transforms data of the result DDF segment to a format conforming to the primary language. Each compute node processes further instructions specified using the primary language to process the transformed result DDF segment mapped to the compute node.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
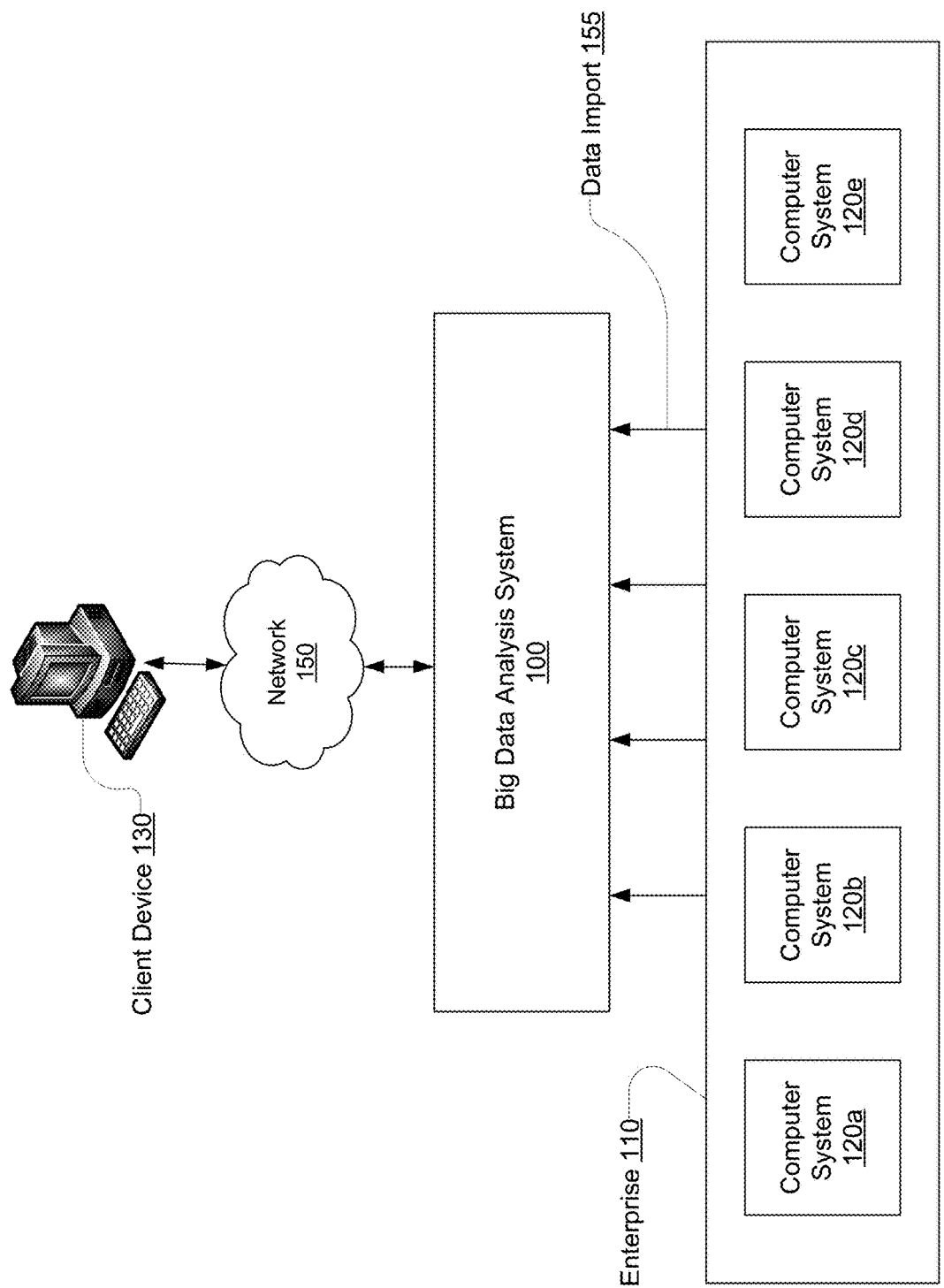
FIG. 1 shows the overall system environment for performing analysis of big data, in accordance with an embodiment of the invention.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A big data analysis system provides an abstraction of database tables based on distributed in-memory data structures obtained from big data sources, for examples, files of a distributed file system. A user can retrieve data from a large, distributed, complex file system and treat the data as database tables. As a result, the big data analysis system allows users to use familiar data abstractions such as filtering data, joining data for large datasets that are commonly supported by systems that handle with small data, for example, single processor database management systems. The big data analysis system supports various features including schema, filtering, projection, transformation, data mining, machine learning, and so on.

Embodiments support various operations commonly used by data scientists. These include various types of statistical computation, sampling, machine learning, and so on. However, these operations are supported on large data sets processed by a distributed architecture. Conventional systems that allow processing of large data using distributed systems Embodiments create a long term session for a user and track distributed data structures for users so as to allow users to modify the distributed data structures. The ability to create long term sessions allows embodiments to provide functionality similar to existing data analysis systems that are used for small data processing, for example, the R programming language and interactive system.

Furthermore, embodiments support high-level data analytics functionality, thereby allowing users to focus on the data analysis rather than low level implementation details of how to manage large data sets. This is distinct from conventional systems, for example, systems that support map-reduce paradigm and require user to express high-level analytics functions into map and reduce functions. The map reduce paradigm requires users to be aware of the distributed nature of data and requires users to use the map and reduce operations for expressing the data analysis operations.

Embodiments further allow integration of large data sets with various machine learning techniques, for example, with externally available machine learning libraries. Furthermore, the ability to store distributed data structures in memory and identify the distributed data structures using URI allows embodiments to support clients using various languages, for example, Java, Scala, R and Python, and also natural language.

Embodiments support collaboration between multiple users working on the same distributed data set. A user can refer to a distributed data structure using a URI (uniform resource identifier). The URI can be passed between users, for example, by email. Accordingly, a new user can get access to a distributed data structure that is stored in memory. Embodiments further allow a user to train a machine learning model, create a name for the machine learning model and transfer the name to another user so as to allow the other user to execute the machine learning model. For example, a data scientist can create a distribute data structure or a machine learning model and provide to an executive of an enterprise to present the data or model to an audience. The executive can perform further processing using the data or the model as part of a presentation by connecting to a system based on these embodiments.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

FIG. 1 shows the overall system environment for performing analysis of big data, in accordance with an embodiment of the invention. The overall system environment includes an enterprise 110, a big data analysis system 100, a network 150 and client devices 130. Other embodiments can use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120" and/or "120" in the figures).

The enterprise 110 is any business or organization that uses computer systems for processing its data. Enterprises 110 are typically associated with a business activity, for example, sale of certain products or services but can be any organization or groups of organizations that generates significant amount of data. The enterprise 110 includes several computer systems 120 for processing information of the enterprise. For example, a business may use computer systems for performing various tasks related to the products or services offered by the business. These tasks include sales transactions, inventory management, employee activities, workflow coordination, information technology management, and so on.

Performing these tasks may generate large amount of data for the enterprise. For example, an enterprise may perform thousands of transactions daily. Different types of information is generated for each transaction including information describing the product/services involved in the transaction, errors/warning generated by the system during transactions, information describing involvement of personnel from the enterprise, for example, sales representative, technical support, and so on. This information accumulates over days, weeks, months, and years, resulting in large amount of data.

For example, airlines process data of hundreds of thousands of passengers traveling every day and large numbers of flights carrying passengers every day. The information describing the flights and passengers of each flight over few years can be several terabytes of data. Enterprises that process petabytes of data are not uncommon. Similarly, search engines may store information describing millions of searches performed by users on a daily basis that can generate terabytes of data in a short time interval. As another example, social networking systems can have hundreds of millions of users. These users interact daily with the social networking system generating petabytes of data.

The big data analysis system 100 allows analysis of the large amount of data generated by the enterprise. The big data analysis system 100 may include a large number of processors for analyzing the data of the enterprise 110. In some embodiments, the big data analysis system 100 is part of the enterprise 110 and utilizes computer systems 120 of the enterprise 110. Data from the computer systems 120 of enterprise 110 that generate the data may be imported 155 into the computer systems that perform the big data analysis.

The client devices 130 are used by users of the big data analysis system 100 to perform the analysis and study of data obtained from the enterprise 110. The users of the client devices 130 include data analysts, data engineers, and business experts. In an embodiment, the client device 130 executes a client application that allows users to interact with the big data analysis system 100. For example, the client application executing on the client device 130 may be an internet browser that interacts with web servers executing on computer systems of the big data analysis system 100.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130 and the big data analysis system 100 are typically performed via a network 150, for example, via the internet. The interactions between the big data analysis system 100 and the computer systems 120 of the enterprise 110 are also typically performed via a network 150. In one embodiment, the network uses standard communications technologies and/or protocols. In another embodiment, the various entities interacting with each other, for example, the big data analysis system 100, the client devices 130, and the computer systems 120 can use custom and/or dedicated data communications technologies instead of, or in addition to, the ones described above. Depending upon the embodiment, the network can also include links to other networks such as the Internet.

System Architecture

Figure 2:
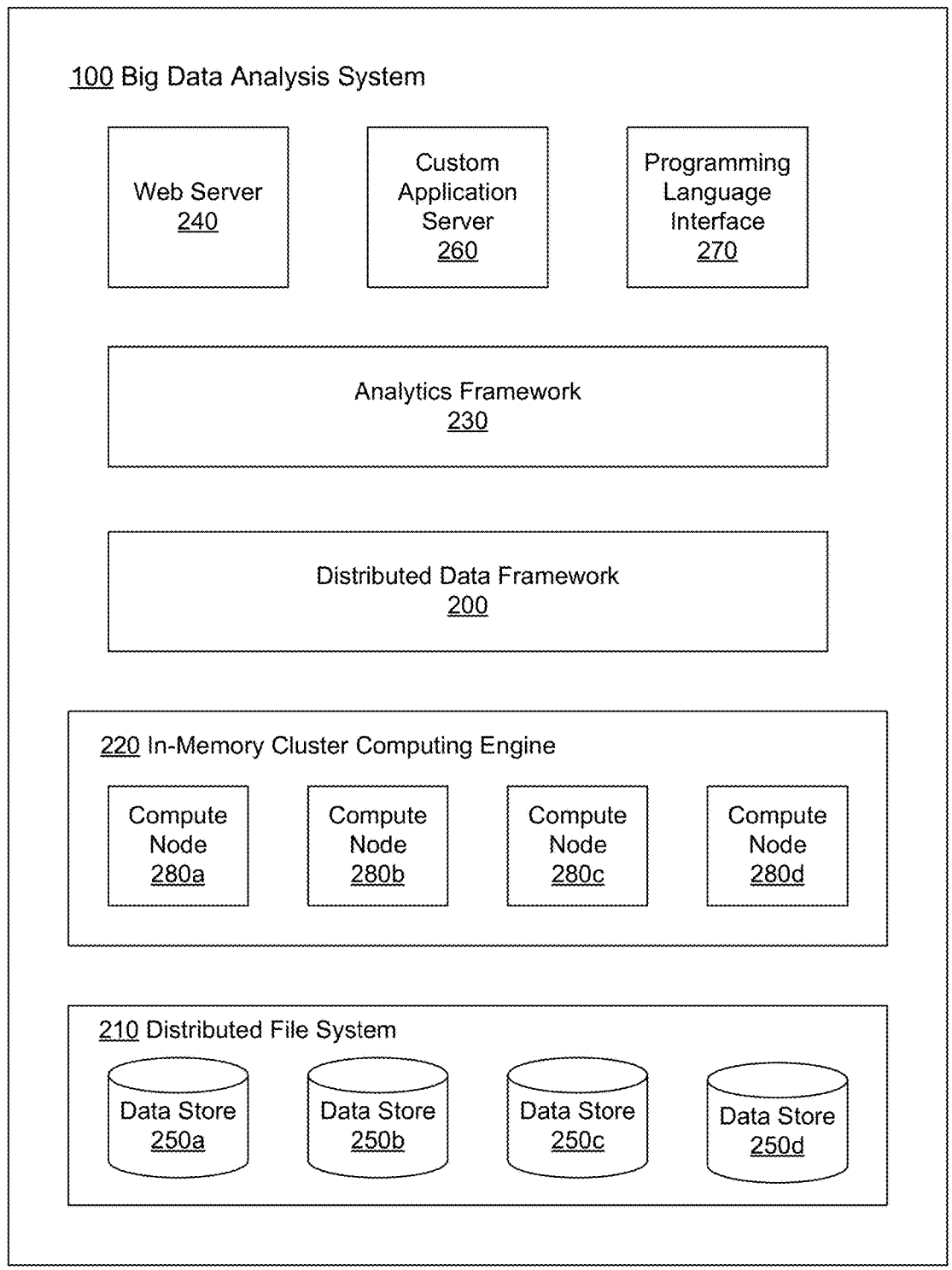
FIG. 2 shows the system architecture of a big data analysis system, in accordance with an embodiment.

FIG. 2 shows the system architecture of a big data analysis system, in accordance with an embodiment. A big data analysis system 100 comprises a distributed file system 210, an in-memory cluster computing engine 220, a distributed data framework 200, an analytics framework 230, a web server 240, a custom application server 260, and a programming language interface 270. The big data analysis system 100 may include additional or less modules than those shown in FIG. 2. Furthermore, specific functionality may be implemented by modules other than those described herein. The big data analysis system 100 is also referred to herein as a data analysis system or a system.

The distributed file system 210 includes multiple data stores 250. These data stores 250 may execute on different computers. The distributed file system 210 may store large data files that may store gigabytes or terabytes of data. The data files may be distributed across multiple computer systems. In an embodiment, the distributed file system 210 replicates the data for high availability. Typically, the distributed file system 210 processes immutable files to which writes are not performed. An example of a distributed file system is HADOOP DISTRIBUTED FILE SYSTEM (HDFS).

The in-memory cluster computing engine 220 loads data from the distributed file system 210 into a cluster of compute nodes 280. Each compute node includes one or more processors and memory for storing data. The in-memory cluster computing engine 220 stores data in-memory for fast access and fast processing. For example, the distributed data framework 200 may receive repeated queries for processing the same data structure stored in the in-memory cluster computing engine 220, the distributed data framework 200 can process the queries efficiently by reusing the data structure stored in memory without having to load the data from the file system. An example of an in-memory cluster computing engine is the APACHE SPARK system.

The distributed data framework 200 provides an abstraction that allows the modules interacting with the distributed data framework 200 to treat the underlying data provided by the distributed file system 210 or the in-memory cluster computing engine 220 interface as structured data comprising tables. The distributed data framework 200 supports an application programming interface (API) that allows a caller to treat the underlying data as tables. For example, a software module can interact with the distributed data framework 200 by invoking APIs supported by the distributed data framework 200.

Furthermore, the interface provided by the distributed data framework 200 is independent of the underlying system. In other words, the distributed data framework 200 may be provided using different implementations in-memory cluster computing engines 220 (or different distributed file systems 210) that are provided by different vendors and support different types of interfaces. However, the interface provided by the distributed data framework 200 is the same for different underlying systems.

The table based structure allows users familiar with database technology to process data stored in the in-memory cluster computing engine 220. The table based distributed data structure provided by the distributed data framework is referred to as distributed data-frame (DDF). The data stored in the in-memory cluster computing engine 220 may be obtained from data files stored in the distributed file system 210, for example, log files generated by computer systems of an enterprise.

The distributed data framework 200 processes large amount of data using the in-memory cluster computing engine 220, for example, materialization and transformation of large distributed data structures. The distributed data framework 200 performs computations that generate smaller size data, for example, aggregation or summarization results and provides these results to a caller of the distributed data framework 200. The caller of the distributed data framework 200 is typically a machine that is not capable of handling large distributed data structures. For example, a client device may receive the smaller size data generated by the distributed data framework 200 and perform visualization of the data or presentation of data via different types of user interfaces. Accordingly the distributed data framework 200 hides the complexity of large distributed data structures and provides an interface that is based on manipulation of small data structures, for example, database tables.

In an embodiment, the distributed data framework 200 supports SQL (structured query language) queries, data table filtering, projections, group by, and join operations based on distributed data-frames. The distributed data framework 200 provides transparent handling of missing data, APIs for transformation of data, and APIs providing machine-learning features based on distributed data-frames.

The analytics framework 230 supports higher level operations based on the table abstraction provided by the distributed data framework 200. For example, the analytics framework 230 supports collaboration using the distributed data structures represented within the in-memory cluster computing engine 220. The analytics framework 230 supports naming of distributed data structures to facilitate collaboration between users of the big data analysis system 100. In an embodiment, the analytics framework 230 maintains a table mapping user specified names to locations of data structures.

The analytics framework 230 allows computation of statistics describing a DDF, for example, mean, standard deviation, variance, count, minimum value, maximum value, and so on. The analytics framework 230 also determines multivariate statistics for a DDF including correlation and contingency tables. Furthermore, analytics framework 230 allows grouping of DDF data and merging of two or more DDFs. Several examples of the types of computations supported by the analytics framework 230 are disclosed in the Appendix.

The big data analysis system 100 allows different types of interfaces to interact with the underlying data. These include programming language based interfaces as well as graphical user interface based user interfaces. The web server 240 allows users to interact with the big data analysis system 100 via browser applications or via web services. The custom application server 260, The web server 240 receives requests from web browser clients and processes the requests. The web browser requests are typically requests sent using a web browser protocol, for example, a hyper-text transfer protocol (HTTP.) The results returned to the requester is typically in the form of markup language documents, for example, documents specified in hyper-text markup language (HTML).

The custom application server 260 receives and processes requests from custom applications that are designed for interacting with big data analysis system 100. For example, a customized user interface receives requests for the big data analysis system 100 specified using data analysis languages, for example, the R language used for statistical computing. The customized user interface may use a proprietary protocol for interacting with the big data analysis system 100.

The programming language interface 270 allows programs written in specific programming languages supported by the big data analysis system 100 to interact with the big data analysis system 100. For example, programmers can interact with the data analysis system 100 using PYTHON or JAVA language constructs.

Figure 3:
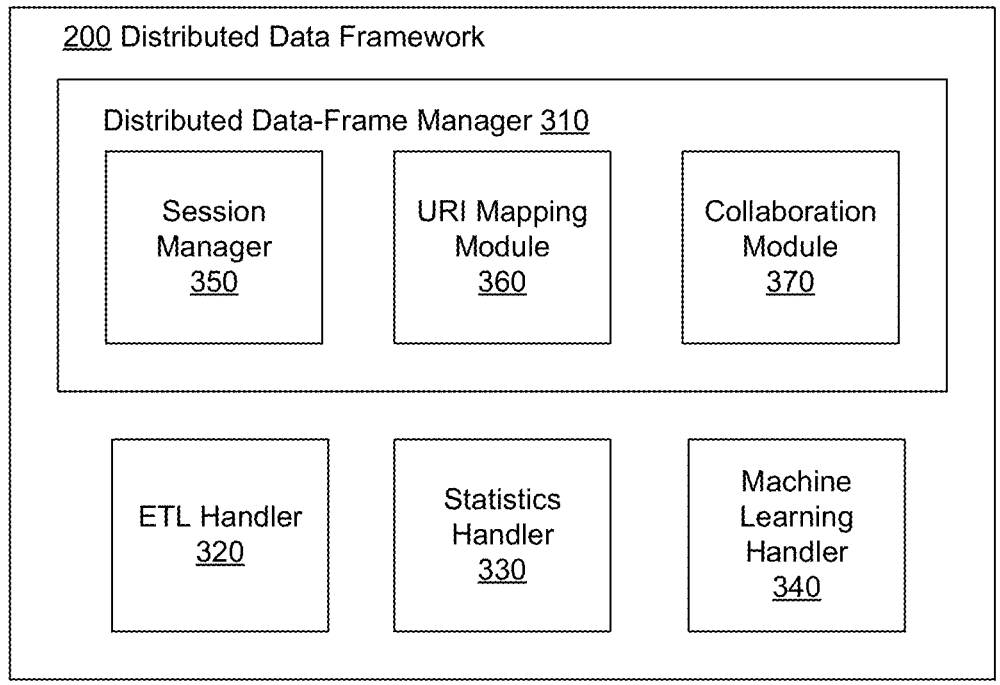
FIG. 3 shows the system architecture of the distributed data framework, in accordance with an embodiment.

The distributed data framework 200 supports various types of analytics operations based on the data structures exposed by the distributed data framework 200. FIG. 3 shows various modules within a distribute data framework module, in accordance with an embodiment of the invention. As shown in FIG. 3, the distribute data framework 200 includes a distributed data-frame manager 210 and handlers including ETL handler 320, statistics handler 330, and machine learning handler 340. Other embodiments may include more or fewer modules than those shown in FIG. 3.

The distributed data-frame manager 310 supports loading data from big data sources of the distributed data file system 210 into DDFs. The distributed data-frame manager 310 also manages a pool of DDFs. The various handlers provide a pluggable architecture making it easy to include new functionality into or replace existing functionality from the distribute data framework 200. The ETL handler 320 supports ETL (extract, transform, and load operations, the statistics handler 330 supports various statistical computations applied to DDFs, and the machine learning handler 340 supports machine learning operations based on DDFs.

In an embodiment, the distributed data framework 200 provides interfaces in different programming languages including Java, Scala, R and Python so that users can easily interact with the in-memory cluster computing engine 220. In a client/server setting, a client can connect to a distributed data framework 200 via a web browser or a custom application based interface and issue commands for execution on the in-memory cluster computing engine 220.

The distributed data framework 200 allows users to load a DDF in memory and perform operations on the data stored in memory. These include filtering, aggregating, joining a data set with another and so on. Since a client device 130 has limited resources in terms of computing power or memory, a client device 130 is unable to load an entire DDF from the in-memory cluster computing engine 220. Therefore, the distributed data framework 200 supports APIs that allow a subset of data to be retrieved from a DDF by a requestor.

In an embodiment, distributed data framework 200 supports an API "fetchRows(df, N)" that allows the caller to retrieve the first N rows of a DDF df. If the distributed data framework 200 receives a request "fetchRows(df, N)", the distributed data framework 200 identifies the first N rows of the DDF df and returns the identified rows to the caller.

The distributed data framework 200 supports an API "sample(df, N)" that allows the caller to retrieve a sample of N rows of a DDF df. In response to a request "sample(df, N)", the distributed data framework 200 samples data of the DDF df based on a preconfigured sampling strategy and returns a set of N rows obtained by sampling to the caller.

The distributed data framework 200 supports an API "sample2ddf(df, p)" that allows the caller to compute a sample of p % of rows of the DDF df and assign the result to a new DDF. In response to a request "sample2ddf(df, p)", the distributed data framework 200 samples data of the DDF df based on a preconfigured sampling strategy to identify p % of rows of the DDF df and creates a new DDF based on the result. The distributed data framework 200 returns the result DDF to the caller, for example, by sending a reference or pointer to the DDF to the caller.

Collaboration Using Distributed Data Frame Structures

In an embodiment, the distributed data-frame manager 310 acts as a server that allows users to connect and create sessions that allow the users to interact with the distributed data framework 200 and process data. Accordingly, the distributed data framework 200 creates sessions allows users to maintain distributed in-memory data structures in the in-memory cluster computing engine 220 for long periods of times, for example, weeks. Furthermore, the session maintains the state of the in-memory data structures so as to allow a sequence of multiple interactions with the same data structure. The interactions include requests that modify the data structure such that a subsequent request can access the modified data structure. As a result, a user can perform a sequence of operations to modify the data structure.

The distributed data-frame manager 310 allows users to collaborate using a particular large distributed data structure (i.e., DDF). For example, a particular user can create a DDF loading data from log files of an enterprise into an in-memory data structure, perform various transformations, and share the data structure with other users. The other user may continue making transformations or view the data from the DDF in a user interface, for example, build a chart based on the data of the DDF for presentation to an audience.

The analytics framework 230 receives a user request (or a request from a software module) to assign a name to a distributed data structure, for example, a DDF or a machine learning model. The analytics framework 230 may further receive requests to provide the name of the distributed data structure to other users or software modules. Accordingly, the analytics framework 230 allows multiple users to refer to the same distributed data structure residing in the in-memory cluster computing engine 220.

The analytics framework 230 supports an API that sets the name of a distributed data structure, for example, a DDF or any data set. For example, a user may invoke a function (or method) "setDDFName(df, string_name)" where "df" is a reference/pointer to the distributed data structure stored in the in-memory cluster computing engine 220 and "string_name" is an input string specified by the user for use as the name of the "df" structure. The analytics framework 230 processes the function setDDFName by assigning the name "string_name" to the structure "df". For example, a user may execute queries to generate a data set representing flight information based on data obtained from airlines. A function/method call "setDDFName(df, "flightinfo")" assigns name "flightinfo" to the data set identified by df.

The analytics framework 230 further supports an API to get a uniform resource identifier (URI) for a data structure. For example, the analytics framework 230 may receive a request to execute "getURI(df)". The analytics framework 230 generates a URI corresponding to the data structure or data set represented by df and returns the URI to the requstor. For example, the analytics framework 230 may generate a URI "ddf://servername/flightinfo" in response to the "getURI(df)" call. The URI may be provided to an application executing on a client device 130.

The analytics framework 230 maintains a mapping from DDFs to URIs. If a DDF is removed from memory, the corresponding URI becomes invalid. For example, if a client application presented a document having a URI that has become invalid, the data analysis system 100 does not process queries based on that URI. The data analysis system 100 may return an error indicating that the query is directed to an invalid (or non-existent) DDF. If the data analysis system 100 loads the same set of data (as the DDF which is removed from the memory), as a new DDF, the client devices request a new URI for the newly created DDF. This is so because the new DDF may have a different location within the parallel/distributed system and may be distributed differently from the previously loaded DDF even though the two DDFs store the same identical data. In an embodiment, the data analysis system 100 may two or more copies of the same DDF. For example, two or more clients may request access to the same data set with the possibility of making modifications. In this situation, each DDF representing the same data is assigned a different URI. For example, a first DDF representing a first copy of the data is assigned a first URI and a second DDF representing a second copy of the same data is assigned a second URI distinct from the first URI. Accordingly, requests for processing received by the data analysis system 100 based on the first URI are processed using the first DDF and, requests for processing received by the data analysis system 100 based on the second URI are processed using the second DDF.

The URI can be communicated between applications or client devices. For example, the client device 130 may communicate the URI to another client device. Alternatively, an application that has the value of the URI can send the URI to another application. For example, the URI may be communicated via email, text message, or by physically copying and pasting from one user interface to another user interface. The recipient of the URI can use the URI to locate the DDF corresponding to the URI and process it. For example, the recipient of the URI can use the URI to inspect the data of the DDF or to transform the data of the DDF.

Figure 4:
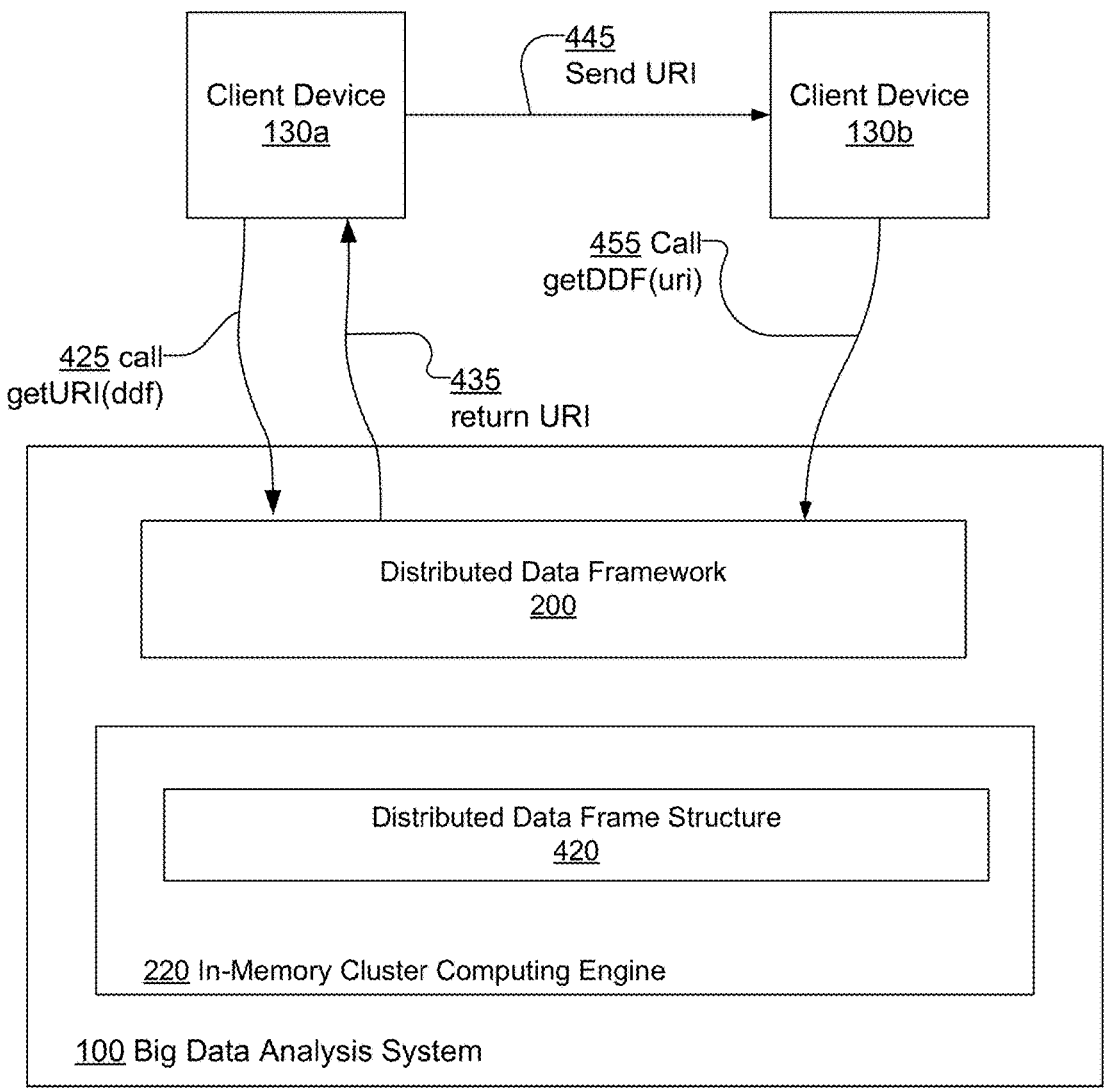
FIG. 4 illustrates a process for collaborative processing based on a DDF between users, according to an embodiment of the invention.

FIG. 4 illustrates collaboration between two client devices using a DDF, according to an embodiment of the invention. Assume that client device 130a has access to an in-memory distributed data structure, for example, a DDF 420 stored in the in-memory cluster computing engine 220. The client device 130a has access to the DDF 420 because an application on client device 130a created the DDF 420. Alternatively, the client device 420 may have received a reference to the DDF 420 from another client device or application. The distributed data framework 200 receives 425 a request to generate a URI (or a name) corresponding to the DDF 420. The distributed data framework 200 generates a URI corresponding to the DDF 420. The distributed data framework sends 435 the generated URI to the client device 130a that requested the URI.

The client device 130a may send 450 the URI corresponding to the DDF 420 to another client device 130b, for example, via a communication protocol such as email. In some embodiments, the URI may be shared between two applications running on the same client device. For example, the URI may be copied from a user interface of an application and pasted into the user interface of the other application by a user. The client device 130b receives the URI. The client device 130b can send 440 requests to the distributed data framework 200 using the URI to identify the DDF 420. For example, the client device 130b can send a request to receive a portion of data of the DDF 420.

In an embodiment, the in-memory cluster computing engine 220 stores a distributed data structure that represents a machine learning model. The distributed data framework 200 receives a request to create a name or URI identifying the machine learning model from a client device 130. The distributed data framework 200 generates the URI or name and provides to the client device 130. The client device receiving the URI can transmit the URI to other client devices. Any client device that receives the URI can interact with the distributed data framework 200 to interact with the machine learning model, for example, to use the machine learning model for predicting certain behavior of entities. These embodiments allow a user (or users) to implement the machine learning model and train the model. The model is stored in-memory by the big data analysis system 100 and is ready to use by other users. The access to the in-memory model is provided by generating the URI and transmitting the URI to other applications or client devices. Users accessing the other client devices or applications can start using the machine learning model stored in memory.

Converting Immutable Datasets to Mutable Distributed Data Frame Structures

In some embodiments, the in-memory cluster computing engine 220 supports only immutable data sets. In other words, a user (e.g., a software module that creates/loads the data set for processing) of the data set is not allowed to modify the dataset. For example, the in-memory cluster computing engine 220 may not provide any methods/functions or commands that allow a data set to modify. Alternatively, the in-memory cluster computing engine 220 may return error if a user attempts to modify data of a data set.

The in-memory cluster computing engine 220 may not support mutable datasets if the in-memory cluster computing engine 220 supports a functional paradigm, i.e., a functional programming model based on functions that take a data set as input and return a new data set upon each invocation. As a result, each operation requires invocation of a function that returns a new data set. Accordingly, the in-memory cluster computing engine 220 does not support modification of states of data sets (these datasets may be referred to as stateless datasets.)

The distributed data framework 200 allows users to convert a dataset to a mutable dataset. For example, the distributed data framework 200 supports a method/function "setMutable(ddf)" that converts an immutable dataset (or DDF) input to the method/function to a mutable DDF. Subsequently, the distributed data framework 200 allows users to make modifications to the mutable DDF. For example, the distributed data framework 200 may add new rows, delete rows, modify rows, and so on from the mutable DDF based on requests.

The distributed data framework 200 implements a data structure, for example, a table that tracks all DDFs that are mutable. A mutable DDF can have a long life since a caller may continue to make a series of modifications to the DDF. A user of the DDF may even pass a reference to the DDF to another user, thereby allowing the other user to continue modifying the dataset. In contrast, immutable datasets have a relatively short life since the dataset cannot be modified and is used as a read only value that input to a function (or output as a result by a function).

The distributed data framework 200 maintains metadata that tracks each mutable DDF. In an embodiment, the distributed data framework 200 implements certain mutable operations by invoking functions supported by the in-memory cluster computing engine 220. Accordingly, the distributed data framework 200 updates the metadata pointing at the DDF with a new DDF returned by the in-memory cluster computing engine 220 as a result of invocation of the function. Subsequent requests to process the DDF are directed to the new DDF structure pointed at by the metadata identifying the DDF. As a result, even though the underlying infrastructure of the in-memory cluster computing engine 220 supports only immutable data structures, the user of the distributed data framework 200 is able to manipulate the data structures as if they are mutable.

Figure 5:
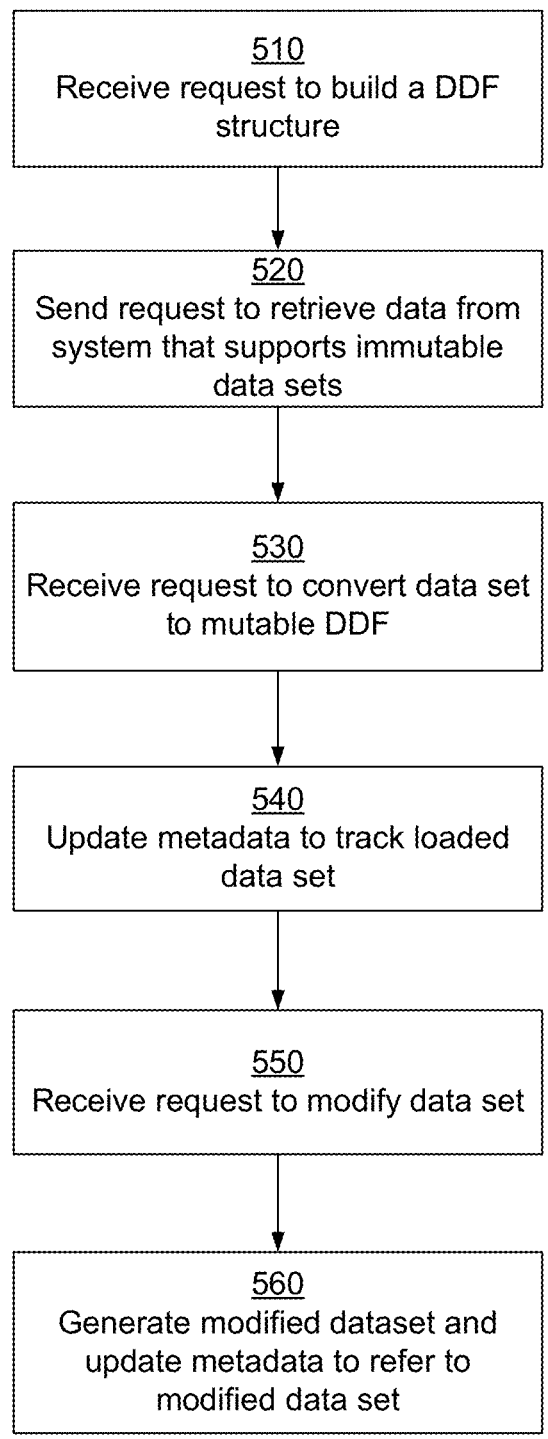
FIG. 5 illustrates a process for converting immutable data sets received from the in-memory cluster computing engine to mutable data sets, according to an embodiment of the invention.

FIG. 5 illustrates a process for converting immutable data sets received from the in-memory cluster computing engine to mutable data sets, according to an embodiment of the invention. The distributed data framework 200 receives a request to build a DDF structure. In an embodiment, the DDF structure may be built by loading data from a set of files of the distributed file system 210, for example, by processing a set of log files of an enterprise.

The distributed data framework 200 sends 520 a request to the in-memory cluster computing engine 220 to retrieve the data of the requested data set. In an embodiment, the in-memory cluster computing engine 220 supports only immutable data sets and does not allow or support modifications to datasets. The in-memory cluster computing engine 220 loads the requested dataset in memory. The dataset may be distributed across memory of a plurality of compute nodes 280 of the in-memory cluster computing engine 220 (the dataset is also referred to as a DDF.)

The distributed data framework 200 marks the data set as immutable (for example, by storing a flag indicating the dataset as mutable in metadata.) This step may be performed if the default type of datasets supported by the in-memory cluster computing engine 220. Accordingly, if the distributed data framework 200 receives a request to modify the data of the dataset, for example, by deleting existing data, adding new data, or modifying existing data, the distributed data framework 200 denies the request. In an embodiment, the dataset is represented as a DDF structure. In other embodiments, the distributed data framework 200 may mark all DDF structures as mutable when they are created.

The distributed data framework 200 receives 530 a request to convert the dataset to a mutable dataset. In an embodiment, the request to convert the dataset may be supported as a method/function call, for example, "setMutable" method/function. A caller may invoke the "setMutable" method/function providing a DDF structure as input. The distributed data framework 200 updates 540 metadata structure describing the DDF to indicate that the DDF is mutable.

Subsequently, the distributed data framework 200 receives 550 a request to modify the DDF, for example, by adding data, deleting data, or updating data. The distributed data framework 200 performs the requested modifications to the DDF. In an embodiment, the distributed data framework 200 invokes a function of the in-memory cluster computing engine 220 corresponding to the modification operation. The in-memory cluster computing engine 220 generates 560 a new dataset that has the value equivalent to the requested modified DDF. The distributed data framework 200 modifies the metadata describing the DDF to refer to the modified DDF instead of the original DDF. Accordingly, if a requester accesses the data of the DDF, the requester receives the data of the modified DDF. Similarly, if a requester attempts to modify the DDF again, the new modification is applied to the modified DDF as identified by the metadata.

Collaboration Using Documents Based on Big Data Reports

Embodiments allow multiple collaborators to interact with a document. A collaborator can be represented as a user account of the system. Each user account may be associated with a client device, for example, a mobile device such as a mobile phone, a laptop, a notebook, or any other computing device. A collaborator may be represented as a client device. Accordingly, the shared document is shared between a plurality of client devices.

The document includes information based on one or more DDFs stored in the in-memory cluster computing engine 220, for example, a chart based on the DDF in the document. The collaborators can interact with the document in a global editing mode that causes changes to be propagated to all collaborators. For example, if a collaborator makes changes to the document or to the DDF identified by the document, all collaborators see the modified document (or the modified document.)

In an embodiment, the document collaboration is based on a push model in which changes made to the document by any user are pushed to all collaborators. For example, assume that the document includes a chart based on a DDF stored in the in-memory cluster computing engine 220. If the distributed data framework 200 receives requests to modify the DDF, the distributed data framework 200 performs the requested modifications to the DDF and propagates a new chart based on the modified DDF to the client devices of the various collaborators sharing the document.

The distributed data framework 200 allows a collaborator X (or a set of collaborators) to switch to a local editing mode in which the changes made by the collaborator X (or any collaborator from the set) to a specified portion of the shared document are local and are not shared with the remaining collaborators. The local editing mode is also referred to herein as limited sharing mode, limited editing mode, or editing mode. For example, if the collaborator modifies the DDF, the changes based on the modifications to the DDF are visible in the document to only the collaborator X. The distributed data framework 200 does not propagate the modifications to the document (or to a portion of the document or the DDF associated with the document) to the remaining collaborators. Accordingly, the distributed data framework 200 continues propagating the original document and any information based on the version of the DDF before collaborator X switched to local editing mode to the remaining collaborators. In an embodiment, the remaining collaborators can modify the original document (and associated DDFs) and the distributed data framework 200 does not propagate the modifications to user X. The collaborator X may share the modified document based on the local edits to a new set of collaborators. Accordingly, the new set of collaborators can continue modifying the version of document created by user X without affecting the document edited by the original set of users.

In an embodiment, the local edits to the shared document are shared between a set of collaborators. Accordingly, if any of the collaborators from the set of collaborators makes a modification to the shared document, the modifications are propagated to only the set of collaborators identified for the local editing. This allows a team of collaborators to make modifications to the shared document before making the modifications publicly available to a larger group of collaborators sharing the document.

In an embodiment, the distributed data framework 200 receives a request that identifies a particular portion of the shared document for local editing. Furthermore, the request received specifies a set of collaborators for sharing local edits to the identified portion. Accordingly, any modifications made by the collaborators of the set to the identified portion are propagated to all the collaborators of the set. However, any modifications made by any collaborator to the shared document outside the identified portion are propagated to all collaborators that share the document, independent of whether the collaborator belongs to the specified set or not.

Figure 6:
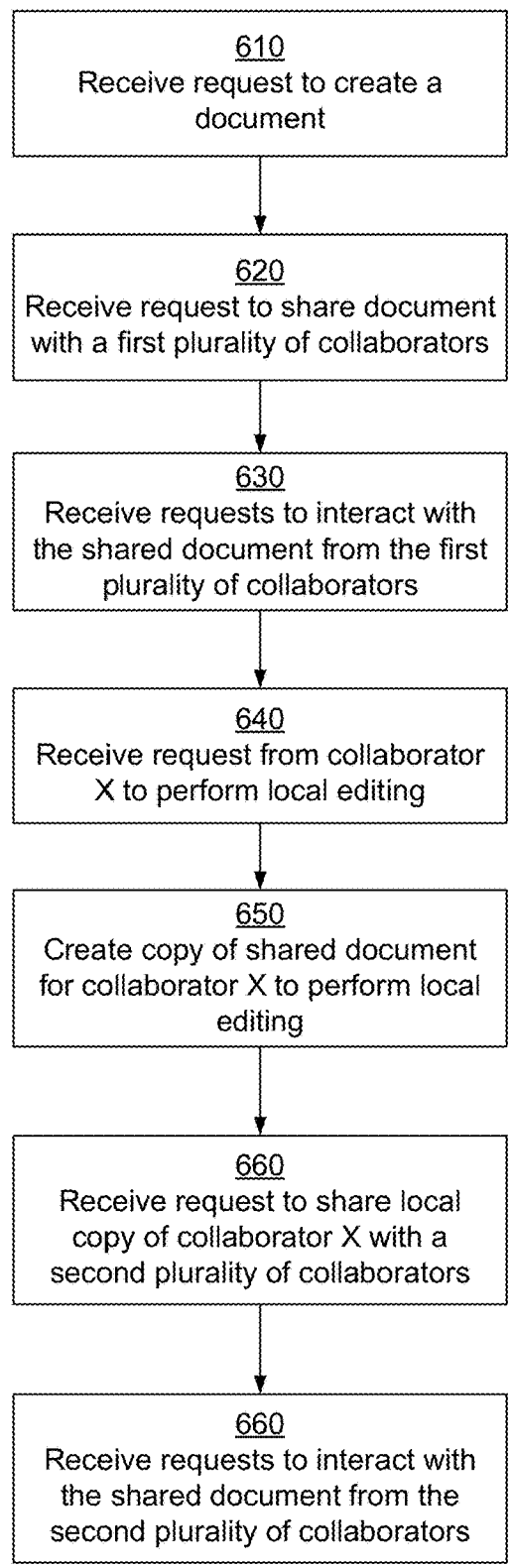
FIG. 6 shows the process illustrating use of a global editing mode and a local editing mode during collaboration, according to an embodiment of the invention.

FIG. 6 shows the process illustrating use of a global editing mode and a local editing mode during collaboration, according to an embodiment of the invention. The distributed data framework 200 receives 610 a request to create a document. In an embodiment, the document is associated with one or more DDFs and receives information associated with the DDF. For example, the document may include a chart based on information available in the DDF. The distributed data framework 200 updates the chart based on changes to the data of the DDF. For example, if the distributed data framework 200 receives an update to the data of the DDF (including requests to delete, add, or modify data), the distributed data framework 200 modifies the chart to display the modified information.

The collaboration module 370 receives 620 a request to share the document with a first plurality of collaborators. The collaboration module 370 receives 630 requests to interact with the shared document from the first plurality of collaborators. The requests may include requests to edit the document, requests to make modifications to the data of the DDF, and so on.

The collaboration module 370 further receives a request from a particular collaborator (say collaborator X) to perform local editing on a selected portion of the shared document (or the entire document). The request identifies a set of collaborators that share the local edits to the selected portion of the document. The collaboration module 370 may create 650 a copy of data related to the identified portion of the shared document for collaborator X to perform local editing. The copy of the portion of the shared document is called the locally accessible document and the original shared document (which can be edited by all collaborators) is called the globally accessible document.

In an embodiment, the collaboration module 370 shares the associated DDFs between the locally accessible document and the globally accessible document when the locally accessible document is created. However, if the distributed data framework 200 receives a request from any of the collaborators to modify an underlying DDF, the distributed data framework 200 makes a copy of the DDF and modifies the copy of the DDF. One of the documents subsequently is associated with the modified DDF and the other document is associated with the original DDF.

In an embodiment, the collaboration module 370 may obtain a subset of data of the DDF that provides data to the chart displayed on the locally edited document. For example, the chart may display data for a small time period out of a longer period of data stored in the DDF. Alternatively, the chart may display partially aggregated data. For example, the DDF may store data at an interval of seconds and the chart may display data aggregated data at intervals of days. Accordingly, the distributed data framework 200 determines the aggregated data that may be much smaller than the total data of the DDF and can be stored on the client device instead of the in-memory cluster computing engine.

In an embodiment, the distributed data framework 200 checks if the size of the aggregated data is below a threshold value. If the size of the aggregated data is below a threshold value, the distributed data framework 200 sends the data to the client device 130 for further processing. The client device can perform certain operations based on the locally stored data, for example, further aggregation based on the data. Processing the locally stored data allows the client device to efficiently process user requests. For example, if the user wants to view a smaller slice of data than that shown on the chart, the client device 130 can use the locally stored data to respond to the query. Accordingly, the chart displayed on the client device is updated without updating the charts displayed on the remaining client devices that share the original document.

Similarly, if the client device requests to further aggregate the data, for example, by requesting aggregates at the intervals of weeks or months, the request can be processed using the locally stored data. In an embodiment, the data set associated with the chart (for example, the partially aggregated data) is stored on another system distinct from the distributed data framework 200 and the client device. The other system allows large data sets to be loaded in memory that exceed the capacity of the client device 130.

The collaboration module 370 determines which copy of the document is associated with the modified DDF and which copy of the document is associated with the original DDF. If the request to modify the DDF is received from the locally accessible document, the distributed data framework 200 associates the locally accessible document with the modified DDF and the globally accessible document with the original DDF. Alternatively, if the request to modify the DDF is received from the globally accessible document, the distributed data framework 200 associates the globally accessible document with the modified DDF and the locally accessible document with the original DDF The collaboration module 370 receives 660 a request to share the locally accessible document with other collaborators (referred to here as a second plurality of collaborators). The second plurality of collaborators may overlap with the first plurality of collaborators. The collaboration module 370 provides access to the document to the second plurality of collaborators. The distributed data framework 200 receives request to modify the locally accessible document from collaborators belonging to the second plurality of collaborators.

The ability to locally edit a portion of the document allows one or more collaborators to modify the document before making the modifications publicly available to all collaborators. For example, a portion of the shared document may be associated with a query that processes an in-memory distributed data structure. The portion of the document may show results of the query as a chart of in text form or both. The system allows one or more collaborators to develop and test the query in a local edit mode to make sure the chart presented is accurate. Once the collaborators have fully developed and tested the query and the chart, the system receives a request from the collaborators to share the identified portion with all users that share the document (not just the developers and testers of the query and the chart.)

In an embodiment, the system determines a target set of collaborators that receive each modification made to the shared document. The target set of collaborators is determined based on whether the modification is made to the portion identified for local editing or another portion. Accordingly, if the system receives a request to modify a portion of the document that is distinct from the portion identified for local editing, the system propagates the changes to the all collaborators sharing the document. This is so because by default all portions of the document are marked for global editing by all collaborators. However, if the system receives a request to modify the portion identified for local editing and the request is received from a collaborator from the set of collaborators S allowed to perform local editing on that portion, the system propagates the modification to all collaborators from the set of collaborators. In an embodiment, the collaborators not belonging to the set S of collaborators are allowed to modify the portion identified for the local editing. However, the system propagates these modifications only to collaborators that do not belong to the set S of collaborators allowed to perform local editing to the identified portion. In an embodiment, the system maintains a separate copy of the identified portion. Accordingly, the modifications made by users of the set S are made to one copy of the document (and propagated to the collaborators belonging to S) and the modifications made by users outside set S are made to another copy (and propagated to the collaborators outside S).

In an embodiment, the portion of the shared document identified for local editing includes a query Q1 processing a DDF associated with the shared document. Assume that a set S1 of collaborators are allowed to perform local edits to the document. The selected portion of the document may include a chart of the document associated with the query or result of the query in text form. The local edits made by collaborators of set S may modify Q1 to become a query Q2. Accordingly, a chart based on query Q2 is propagated to collaborators belonging to set S1 and a chart based on the original query Q1 is propagated to the remaining collaborators (outside set S1) that share the document. If the data of the DDF is modified, the queries Q1 and Q2 are reevaluated to build a new corresponding chart (or textual representation of the result). The chart or results based on query Q2 are propagated to the collaborators of set S1 and the charts or results based on query Q1 are propagated to the remaining collaborators (outside the set S1.)

The system allows various portions of the same shared document to be locally edited by different collaborators or different sets of collaborators. For example, the system may receive a first request to allow local editing of a first portion of the shared document by a first set of collaborators. Subsequently the system may receive a second request to allow local editing of a second portion of the shared document by a second set of collaborators. The first and second set of collaborators may overlap or may be distinct.

Collaborative Code Editing Via Shared Documents

A shared document includes text portions, result portions, and code blocks. A text portion is received from a user and shared with other users. The shared document may be associated with one or more DDFs stored across a plurality of compute nodes. A code block may process data of a DDF. The code block may include queries that are executed. The result of execution of a query is displayed on the result portions of the document, for example, as charts. A code block is also referred to herein as a cell.

Embodiments allow references to DDFs to be included in documents. Users interacting with the big data analysis system 100 can share documents and interact with the same shared document via different client devices 130. If two or more documents share a DDF, changes made to the DDF via a document result in data displayed on the other documents being modified. For example, documents D1 and D2 may be distinct documents that have references to a DDF df. Document D1 may be shared by a set of users S1 and document D2 may be shared by a set of users S2 where S1 and S2 may be distinct sets of users with no overlap. However if a user U1 from set S1 executes code via document D1 that modifies the DDF df, a user U2 from set S2 can view the modifications to the DDF df even though U2 is not sharing the document D1 with user U1. For example, the code modifications made by user U1 via document D1 may cause a chart or a result set displayed on document D2 to be updated as a result of modifications made to DDF df.

Figure 7:
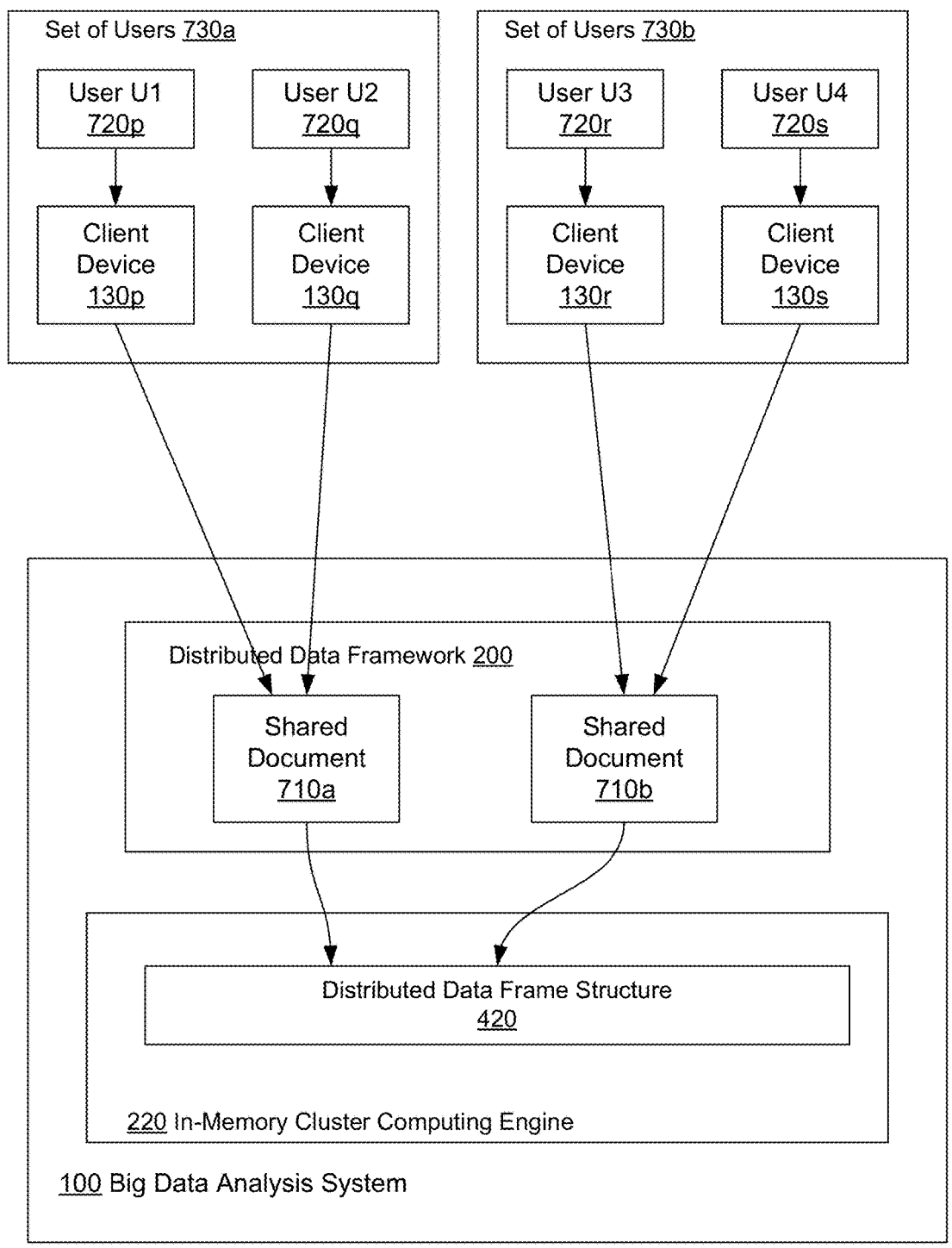
FIG. 7 shows collaborative editing of documents including text, code, and charts based on distributed data structures, according to an embodiment.

FIG. 7 shows collaborative editing of documents including text, code, and charts based on distributed data structures, according to an embodiment. As shown in FIG. 7, the distributed data framework 200 stores two shared documents 710*a* and 710*b*. The shared documents include references to the in-memory distributed data frame structure 420 (referred to as the DDF) stored in the in-memory cluster computing engine 220.

Each shared document 710 is associated with a set 730 of users 720 interacting with the shared document 710 via client devices 130. For example, users 720*p* and 720*q* interact with shared document 710*a* via client devices 130*p* and 130*q* respectively. Similarly, users 720*r* and 720*s* interact with shared document 710*b* via client devices 130*r* and 130*s* respectively. There may be more or less number of users in each set 730 of users sharing a document than those indicated in FIG. 7. The sets 730 of users sharing a document may be distinct from a set of users sharing another document (i.e., have no overlap between the sets) or the sets of users sharing two distinct shared documents 710 may have an overlap (with one or more users having access to both the shared documents).

The shared document 710 may include text, code, and results based on code. The results based on code may comprise results present as text or results presented as charts, for example, bar charts, scatter plots, pie charts and so on. In an embodiment, the results presented in a document are associated with in-memory distributed data frame structure 420 (referred to as the DDF) stored in the in-memory cluster computing engine 220. For example, the document may specify a query based on the DDF such that the results/chart displayed in the document are based on the result of executing the query against the DDF. The code specified in the document may include a query for which the results are shown in the document. If a user updates the query of the shared document, each of the users that share the document, receive updated results displayed in the shared document.

The code specified in the document may include statements that modify the DDF, for example, by deleting, adding, updating rows, columns, or any other portion of data of the DDF. If a user modifies the DDF, the results displayed in the document may get updated based on the modified DDF. For example, if certain rows of the DDF are deleted, any aggregate results displayed in the document or charts based on the DDF may get updated to reflect the deletion of the rows. Furthermore, if there are other documents that share the same DDF (for example, by including a URI to the DDF), the results/chart displayed in those documents may be updated to reflect the modifications to the shared DDF.

The shared documents may represent articles, presentations, reports and so on. The collaborative editing allows users to include charts and results of large distributed data structures in documents. For example, a team of developers may build an in-memory distributed data structure and share the URI of the in-memory distributed data structure with an executive for presentation to an audience. The ability to share the in-memory distributed data structure allows the ability to update the data structure to reflect the latest information. This is distinct from a presentation with static information that doesn't change no matter when the presentation is given. In contrast, the sharing of documents with code and results based on executable code allows presentation of latest results that may get updated as the executive makes the presentation.

As shown in FIG. 7, user U1 may update text of the shared document 710a (the text referring to static strings of text that are distinct from executable code). As a result of editing of the text by user U1, the updated text of the document is sent by the distributed data framework 200 to all users (e.g., users U1, U2) that share the document 710a. However, the result of editing the text does not affect other documents that are distinct from the updated document, for example, document 710b and therefore, the users of set 730b are not affected by the updating of the text of document 710a.

Embodiments further allow sharing of executable code and results based on sharing of code with other users. As shown in FIG. 7, user U1 may update a query included in shared document 710a. The modification of the query may cause changes to results or charts presented in the document. As a result, the distributed data framework 200 executes the updated query using the DDF references in the document 710a and sends the updated results or chart to the remaining users of the set 730a (e.g., user U2.) If the query is simply reading the data of the DDF, the result of modification of the query is presented only to the users of the set 730a that share the modified document (and is not shown to users of set 730b that share the document 710b).

Embodiments further allow a user to execute code that modifies the DDF referenced by the shared document 710a. As a result, the data of the DDF may be changed (e.g., deleted, updated, or new data added.) The modification of DDF may cause results of queries of the document to be updated if the queries use the DDF. Accordingly, the distributed data framework 200 identifies all queries of the document 710a that use the DDF and updates the results of the queries displayed in the document. The updated document is sent for presentation to the users of the set 730a.

Furthermore, the distributed data framework 200 identifies all other documents of that include a reference to the DDF. The distributed data framework 200 identifies queries of all the identified documents and updates the results/charts of the queries displayed in the respective documents if necessary. The distributed data framework 200 sends the updated documents for presentation to all users that share the document. For example, the DDF 420 may be updated based on execution of code of shared document 710a. The distributed data framework 200 updates results of queries based on the DDF 420 in document 710a as well as document 710b. The updated document 710a is sent to users of the set 730a and the updated document 710b is sent to the users of the set 730b.

In an embodiment, a user may request a document or a portion of a document to be locally edited (and not shared). In this embodiment, the distributed data framework 200 makes a copy of the DDF 420 or an intermediate result set based on the DDF 420. In some embodiments, the distributed data framework 200 simply notes that the document is being locally edited and continues to share the DDF 420 with other documents until the DDF 420 is edited. If the DDF 420 is edited, the distributed data framework 200 makes a copy of the DDF for the document that is being locally edited. Note that the document being locally edited may be shared by a set of users even though it does not share the DDF referenced in the document with other documents.

In an embodiment, the portion of the document being locally edited is based on an intermediate result derived from the DDF 420. Accordingly, the distributed data framework 200 stores the intermediate result in either the in-memory cluster computing engine 220 (if the intermediate result is large) or else in a separate server (that may not be distributed). In an embodiment, the intermediate result is stored in the client device 130. Certain operations based on the intermediate results can be performed based on the data of the intermediate result, for example, aggregation of the intermediate results, changing the formal of the chart (so long as the new format does not require additional data from the DDF). For example, a bar chart may be changed to a line chart based on the intermediate result. However, changing of a bar chart to a scatter plot may require accessing the DDF for obtaining a new sample data (for example, if the user requests to display a scatter plot based on a subset of data of the bar chart.)

Figure 8:
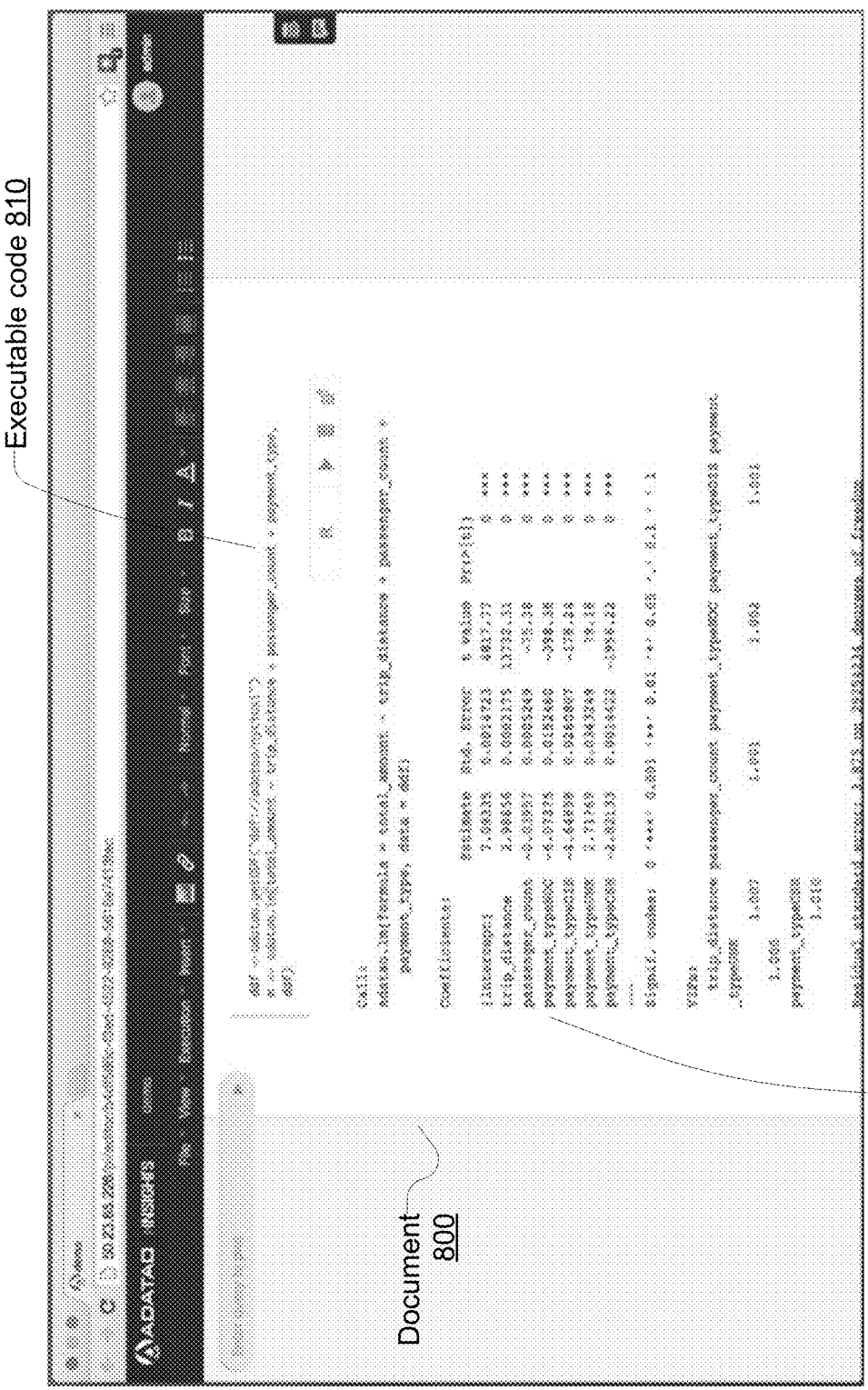
FIG. 8 shows an example of shared document with code and results based on code, according to an embodiment.

FIG. 8 shows an example of shared document with code and results based on code, according to an embodiment. As shown in FIG. 8, the document 800 includes executable code 810. The document 800 also includes results of execution of the executable code. The example executable code shown in FIG. 8 is "m←adatao.lm(total_amount~trip_distance+payment_type, data=ddf)". The executable code 810 is based on a DDF (identified as "ddf") used in a machine learning model (identified as "lm"). This example code builds a linear model of total_amount as function of trip_distance and payment_type. The result 820 of execution of the linear model using the DDF ddf is shown in text form in FIG. 8. In other embodiments, the result of execution of a command can be shown in a chart form.

Figure 9:
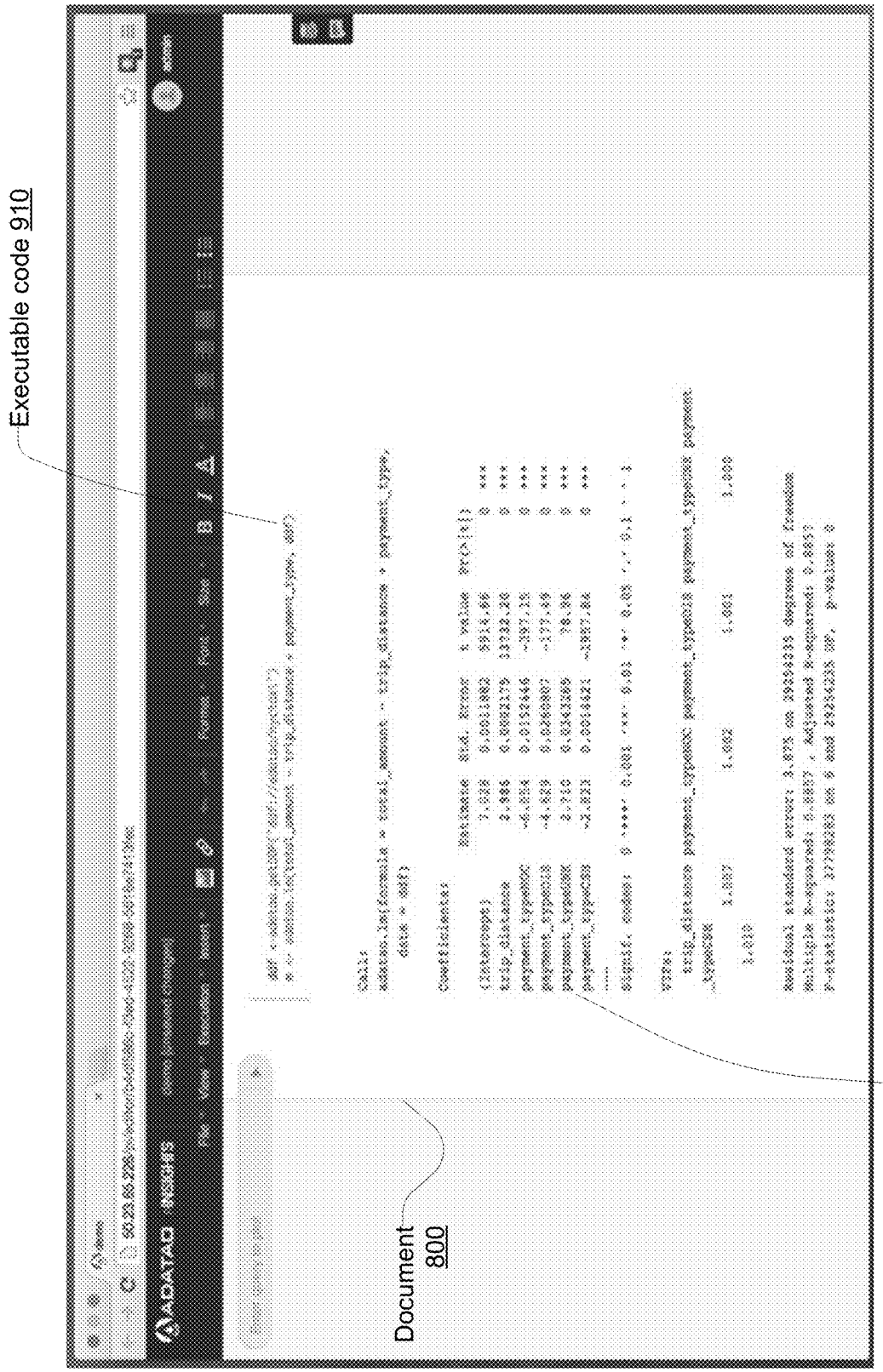
FIG. 9 shows an example of shared document with code and results updated based on execution of the code, according to an embodiment.

The user can modify the executable code, thereby causing updated results to be presented to all users sharing the document. FIG. 9 shows the document of FIG. 8 with modifications made to the code, thereby causing the results to be updated, according to an embodiment. The model shown in FIG. 8 is updated to change the model. The distributed data framework 200 executes the modified code 910 to obtain a new set of results 920. The updated results are presented to all users that share the document 800. If a modification is made to the data of the DDF ddf, the results of all documents that include executable code based on the DDF ddf gets modified.

Figure 10:
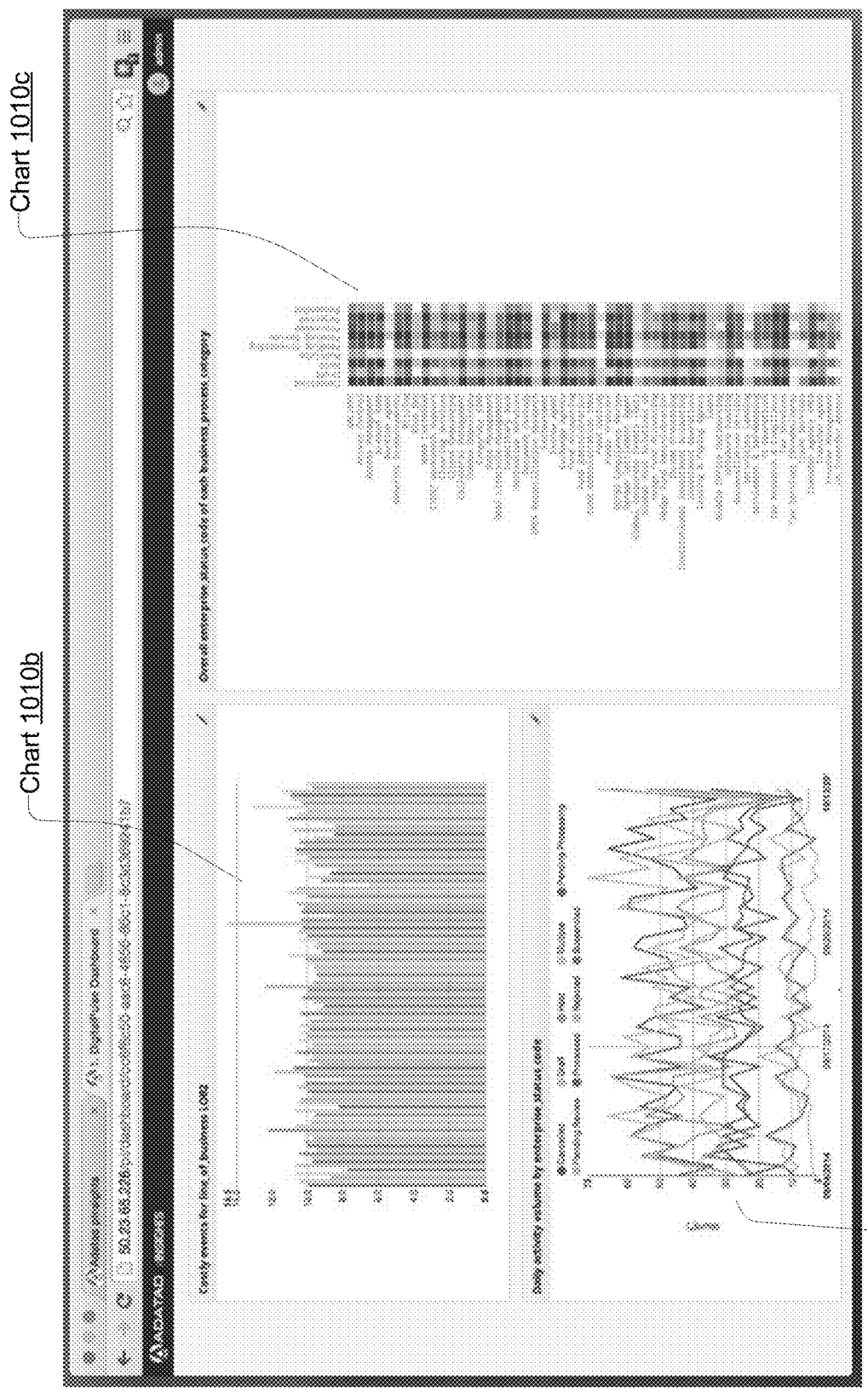
FIG. 10 shows an example of a dashboard generated from a document based on distributed data structures, according to an embodiment.

The analytics framework 230 generates reports, presentations, or dashboards based on the document comprising the text, code, and results. FIG. 10 shows an example of a dashboard generated from a document based on distributed data structures, according to an embodiment. The analytics framework 230 receives information identifying portions of the shared document that should not be displayed in the generated report/dashboard. For example, a user may indicate that portions of the document including executable code should not be displayed in the report/presentation/dashboard. The analytics framework 230 generates the requested report/presentation/dashboard by rendering the information identified for inclusion and excluding the information identified for exclusion.

In an embodiment, the analytics framework 230 receives a request to convert the shared document into a periodic report. The analytics framework 230 receives a schedule for generating the periodic report. The analytics framework 230 executes the code blocks of the shared document in accordance with the schedule. Accordingly, the analytics framework 230 updates the result portions of the shared document based on the latest execution of the code block. For example, a code block may include a query based on a DDF. The analytics framework 230 updates the result portion corresponding to the code block based on the latest data of the DDF. The analytics framework 230 shares the updated document with users that have access to the shared document. These embodiments allow the analytics framework 230 to provide a periodic report to users. For example, the shared document may include a reference to a DDF based on an airlines database and the analytics framework 230 provides weekly or monthly reports to the users sharing the document. Similarly, the analytics framework 230 can convert the shared document into a slide show or a dashboard based on a user request.

In an embodiment, the analytics framework 230 receives a request to generate a periodic report, slideshow, or a dashboard and generates the requested document based on the shared document rather than convert the shared document as requested. The analytics framework 230 maintains the periodic reports, slideshows, or dashboards as shared documents that can be further edited and shared with other users. Accordingly, various operations disclosed herein apply to these generated/transformed documents.

FIG. 10 shows various charts 1010a, 1010b, and 1010c shown in the dashboard generated by the analytics framework 230. The charts 1010 refer to DDFs stored in the in-memory cluster computing engine 220. Accordingly, the distributed data framework 200 may automatically update the data of the charts 1010 based on updates to the data of the associated DDF.

In embodiment, the analytics framework 230 identifies all charts in an input document. The analytics framework 230 determines a layout for all the charts in a grid, for example, a 3 column grid. The analytics framework 230 may receive (from the user) a selection of a template specifying the layout of the dashboard. The analytics framework 230 receives instructions from users specifying modifications to the layout. For example, the big data analysis system 100 allows users to drag-drop charts snapping to the grid, resize charts within the grid. The big data analysis system 100 also allows users to set dashboards to automatically be refreshed at a specified time interval e.g. 30 second, 1 minute, etc. The generated dashboard includes instructions to execute any queries associated with each chart at the specified time interval by sending the queries to the distributed data framework 200 for execution.

Various portions of a document that is shared can be edited by all users that share the document. In an embodiment, if the system receives a user request for execution of a code block (or cell), the system shows an indication that the code block in the shared document is being executed. Accordingly, the system shows a change in the status of the code block. The status of the code block may be indicated based on a color of the text or background of the code block, font of the code block, or by any visual mechanism, for example, by showing the code block as flashing. In some embodiments, the status of the code block may be shown by a widget, for example, an image or icon associated with the code block. Accordingly, a status change of the code block causes a visual change in the icon or the widget. The changed status of the code block is synchronized across all client applications or client devices that share the document. Accordingly, the system shows the status of the code block as executing on any client device that is displaying a portion of the shared document including the code block that is executing.

In an embodiment, if the system receives a request to execute a code block of the shared document, the system locks the code block of the document, thereby preventing any users from editing the code block. The system also prevents other users from executing the code block. Accordingly, the system does not allow any edits to be performed on the code block that is executing from any client device that is displaying a portion of the shared document including the code block. Users are allowed to modify other portions of the document, for example, text portions or other code blocks. Nor does the system allow the code block to be executed again from any client device until the current execution is complete. In other words, the system allows a single execution by a user for a code block at a time. Once the execution of the code block is complete, the system allows users to edit the code block or execute it again.

A user may close the client application (e.g., a browser or a user-agent software) used to view/edit the shared document on a client device 130. If the client closes the client application while one or more code blocks, the system continues executing the code blocks and tracks the status of the code blocks. If a user that closed the client application reopens the client application to view the document, the system receives a login request from the user. In response to the request to view the shared document, the system provides the latest status of the code blocks. If a code block is executing, the system provides information indicating that the code block is executing and the user is still not allowed to edit or execute the code block. If the code block has completed execution, the system updates the result portions of the document and sends the updated document to the client device of the user and allows the user to edit or execute the code block.

Multi-Language Documents Processing Distributed Data Structures

Embodiments allow shared documents that interact with the big data analysis system 100 using multiple languages for processing data of DDFs. A shared document includes text portions, result portions, and code blocks. A text portion is received from a user and shared with other users. The shared document may be associated with one or more DDFs stored across a plurality of compute nodes. A code block may process data of a DDF.

A user can interact with the DDF by processing a query and receiving results of the query. The results of the query are displayed in the document and may be shared with other users. A user can also execute a statement via the document that modifies the DDF. The distributed data framework 200 receives statements sent by a user via a document and processes the statements (a statement can be a command or a query).

A code block may include instructions that modify the DDF. A code block may include queries that are executed by the data analysis system. The result of execution of the queries is presented in result portions of the shared document. A result portion may present results in text form or graphical form, for example, as charts. Modification of a query by a user in a code block may result in the result portion of all users sharing the document getting updated.

The big data analysis system 100 allows users to send instructions for processing data of a DDF using different languages. For example, the big data analysis system 100 receives a first set of instructions in a first language via a document and subsequently a second set of instructions in a second language provided via the same document (or via a different document). Both the first and second set of instructions may process data of the same DDF. The ability to collaborate via multiple languages allows different users to use the language of their choice while collaborating. Furthermore, certain features may be supported by one language and not another. Accordingly, a user can use a first language for providing instructions and operations supported by that language and switch to a second language to use operations supported by the second language (and not supported by the first language). In an embodiment, the big data analysis system 100 allows users to specify code cells or code blocks in a document. Each code block may be associated with a specific language. This allows a user to specify the language for a set of instructions. In an embodiment, a shared document uses a primary language for processing the DDFs. However, code blocks of one or more secondary languages may be included.

Figure 11:
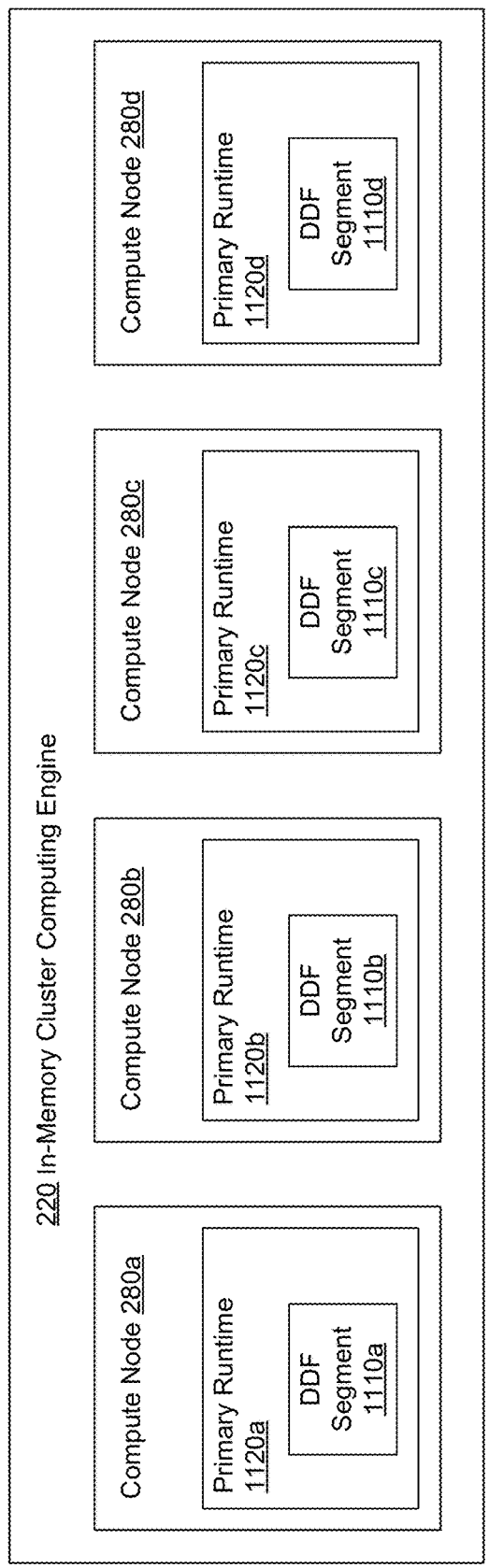
FIG. 11 shows the architecture of the in-memory cluster computing engine illustrating how a distributed data structure (DDF) is allocated to various compute nodes, according to an embodiment.

FIG. 11 shows the architecture of the in-memory cluster computing engine illustrating how a distributed data structure (DDF) is allocated to various compute nodes, according to an embodiment. As shown in FIG. 11, the in-memory cluster computing engine 220 comprises multiple compute nodes 280. A DDF is distributed across multiple compute nodes 280. Each compute node 280 is allocated a portion of the data of the DDF, referred to as a DDF segment 1110. When the distributed data framework 200 receives a request to process data of a DDF, the distributed data framework 200 sends a corresponding request to each compute node 280 storing a DDF segment 1110 to process data of the DDF segment 1110. As shown in FIG. 11, each compute node 280 includes a primary runtime 1120 that stores the DDF segment 1110. The DDF segment 1110 has a data structure based on the primary runtime 1120. For example, the data structure of the DDF segment 1110 conforms to the primary language of the distributed data framework and can be processed by the primary runtime executing instructions of the primary language.

The primary runtime 1120 is capable of processing instructions in a primary language of operation for the distributed data framework 100. Accordingly, if a user provides a set of instructions using the primary language, the distributed data framework 100 provides corresponding instructions to the primary runtime for execution. For example, the primary runtime 1120 may be a virtual machine of a language, for example, a JAVA virtual machine for processing instructions received in the programming language JAVA. Alternatively, the primary runtime 1120 may support other programming languages such as PYTHON, R language, or any proprietary languages.

Figure 12:
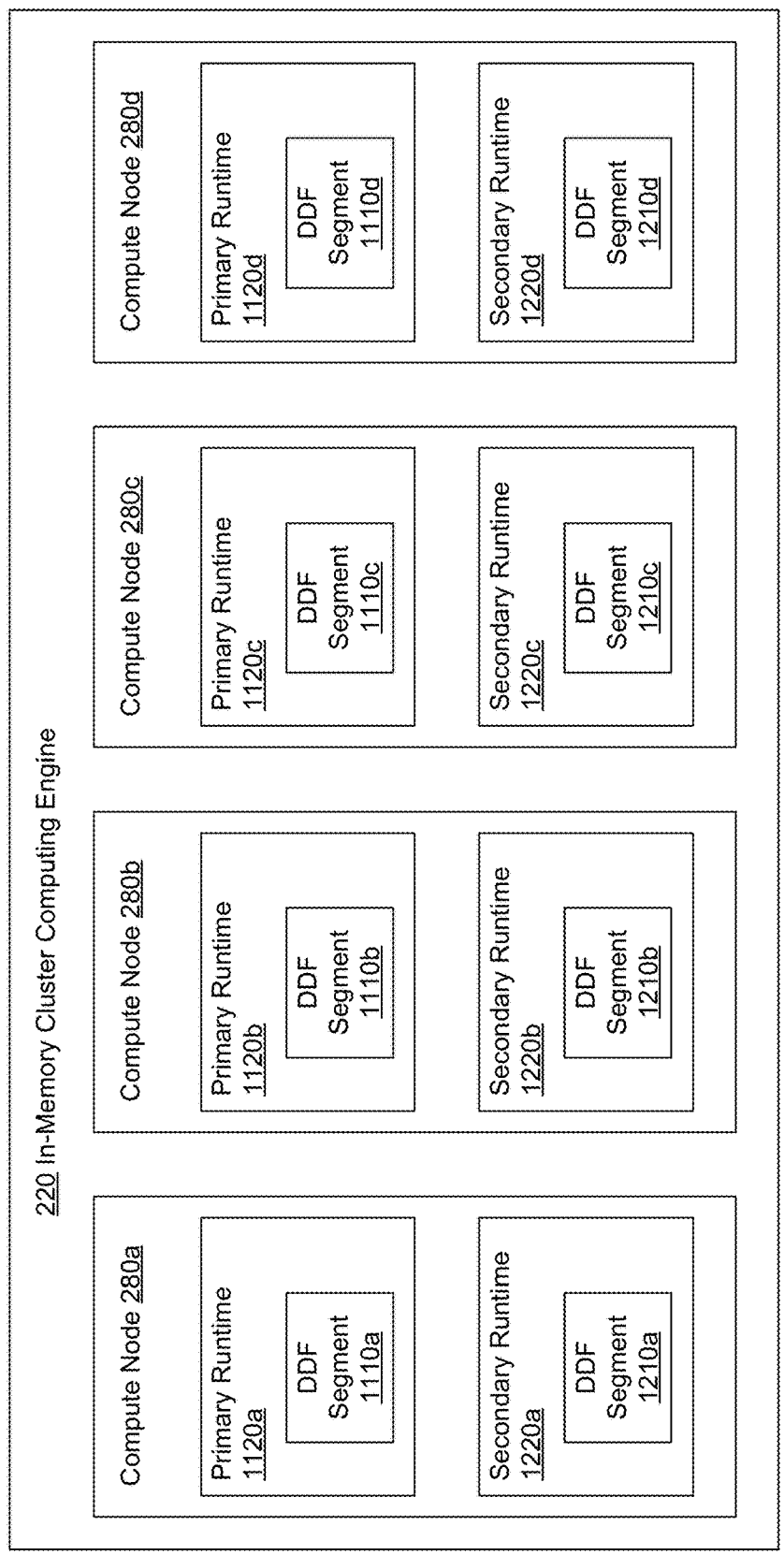
FIG. 12 shows the architecture of the in-memory cluster computing engine illustrating how multiple runtimes are used to process instructions provided in multiple languages, according to an embodiment.

FIG. 12 shows the architecture of the in-memory cluster computing engine illustrating how multiple runtimes are used to process instructions provided in multiple languages, according to an embodiment. The distributed data framework 100 may receive instructions in a language different from the primary language. For example, if the primary language for interacting with the distributed data framework 100 is JAVA, a user may provide a statement in the R language.

In an embodiment, users can interact with the distributed data framework 100 using a set of language agnostic APIs supported by the distributed data framework 100. The language agnostic APIs allow users to provide the required parameters and identify a method/function to be invoked using the primary language. The distributed data framework 100 receives the parameters and the method/function identifier and provides these to the primary runtime 1120. The primary runtime 1120 invokes the appropriate method/function using the provided parameter values. The primary runtime 1120 provides the results by executing the method/function. The distributed data framework 100 provides the results to the caller for display via the document used to send the request.

The distributed data framework 100 may receive instructions in a language other than the primary language of the distributed data framework 100 (referred to as a secondary language). For example, the distributed data framework 100 may receive a request to process a function that is available in the secondary language but not in the primary language. For example, the R language supports several functions commonly used by data scientists that may not be supported by JAVA (or not available in the set of libraries accessible to the primary runtime 1120.

The in-memory cluster computing engine 220 starts a secondary runtime 1220 that is configured to execute instructions provided in the secondary language. The secondary runtime 1220 is started on each compute node 280 that has a DDF segment 1110 for the DDF being processed. Each compute node 280 transform the data structure representing the DDF segment 1110 conforming to the primary language to a data structure representing the DDF segment 1210 conforming to the secondary language.

For example, if the primary runtime is a JAVA virtual machine and the secondary runtime is a R runtime, the compute node transforms a DDF segment represented as a list of byte buffers (representing a TablePartition structure conforming to the JAVA language representation) to a list of vectors in R (representing a DataFrame structure of R language). Furthermore, the compute node performs appropriate data type conversions, e.g. the compute node converts a TablePartition Columniterator of Integer to an R integer vector, Java Boolean to R logical vector, and so on. Furthermore, the compute node encodes any special values based on the target runtime, for example, the compute node converts floating point NaN (not a number special value) to R's NA value (not-available value) while converting to an R representation, or to Java null pointers while converting to a Java representation. If the secondary runtime is based on a Python, the compute node converts the DDF segment to a DataFrame representation of Python language.

In an embodiment, the primary runtime 1120 (of each compute node having a DDF segment of the DDF being processed) executes instructions that transform the DDF segment 1110 representation (conforming to the primary language) to a DDF segment representation conforming to the secondary language). The primary runtime 1120 uses certain protocol to communicate the transformed DDF segment representation to the secondary runtime 1220. For example, the primary runtime 1120 may open a pipe (or socket) to communicate with the process of the secondary runtime 1220. The transformed DDF segment representation is stored in the secondary runtime 1220 as DDF segment 1210. The secondary runtime 1220 performs the processing based on the DDF segment 1210 by executing the received instructions in the secondary language.

The processing performed by the secondary runtime 1220 may result in generation of a new DDF (that is distributed as DDF segments across the compute nodes.) Accordingly, each secondary runtime 1220 instance stores a DDF segment corresponding to the generated DDF. The generated DDF segment stored in the secondary runtime 1220 conforms to the secondary language. The secondary runtime 1220 transforms the generated DDF segment to a transformed generated DDF segment that conforms to the primary language. The secondary runtime 1220 sends the transformed generated DDF segment to the primary runtime 1120. The secondary runtime stores the transformed generated DDF segment for processing instructions received via the document in the primary language.

Alternatively the processing performed by the secondary runtime 1220 may result in modifications to the stored DDF segment 1210. The modified DDF segment conforms to the secondary language. The secondary runtime 1220 sends the transformed modified DDF segment to the primary runtime 1120. The secondary runtime stores the transformed modified DDF segment for processing instructions received via the document in the primary language. This mechanism allows the distributed data framework 200 to process instructions received for processing the DDF in languages other than the primary language of the distributed data framework 200. Accordingly, embodiments allow the DDF to be mutated using a secondary language. The distributed data framework 200 allows further processing to be performed using the primary language. Accordingly, a user can mix instructions for processing a DDF in different languages in the same document.

In an embodiment, the document for processing the DDF in multiple languages is shared, thereby allowing different users to provide instructions in different languages. In another embodiment, the same DDF is shared between different documents. The DDF may be processed using instructions in different languages received from different documents. Accordingly, the distributed data framework 200 may modify a DDF based on instructions in one language and then receive queries (or statements to further modify the DDF) in a different language. Embodiments can support multiple secondary languages by creating multiple secondary runtimes, one for processing instructions of each type of secondary language.

Figure 13:
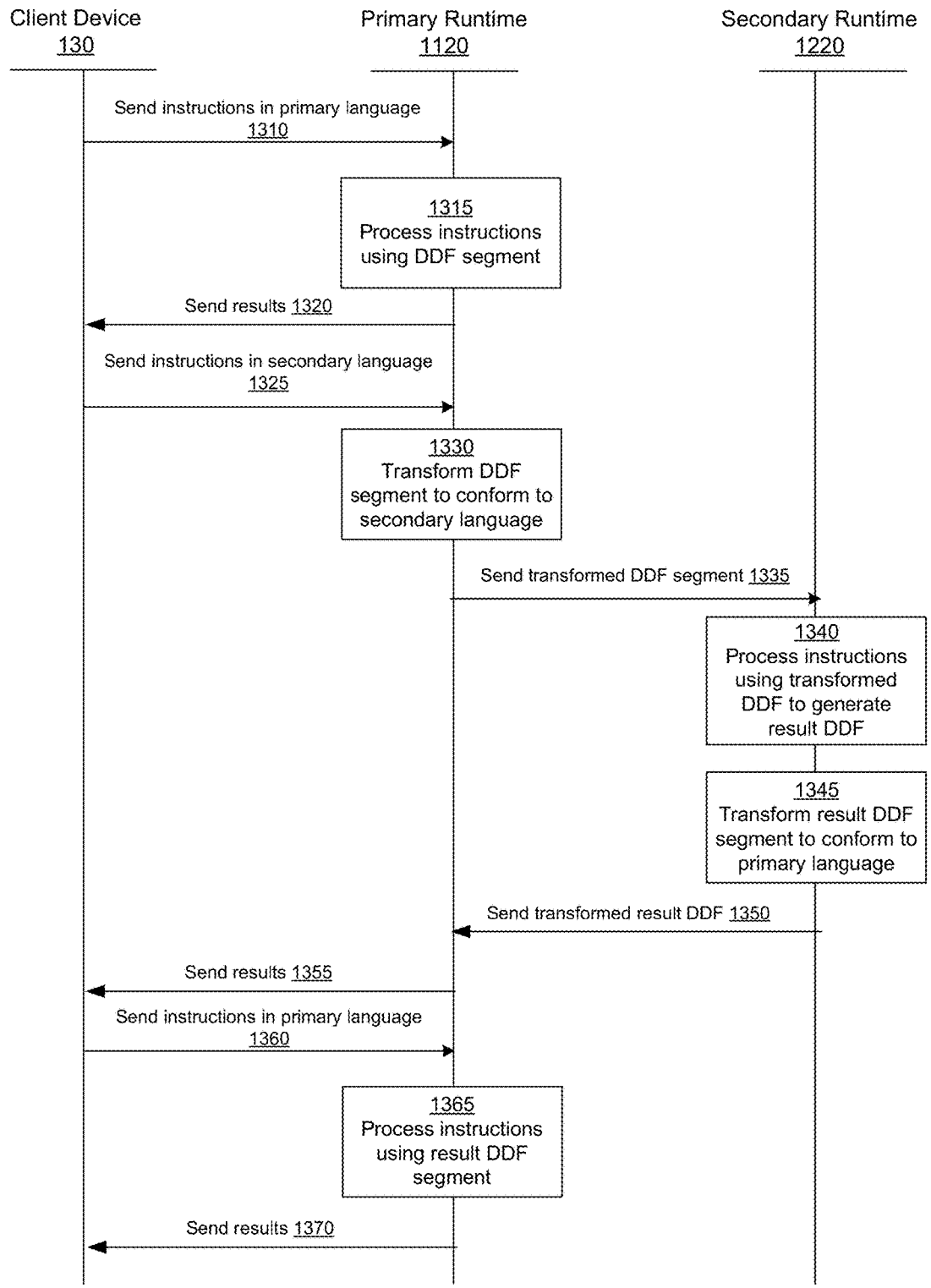
FIG. 13 shows an interaction diagram illustrating the processing of DDFs based on instructions received in multiple languages, according to an embodiment.
Figure 14:
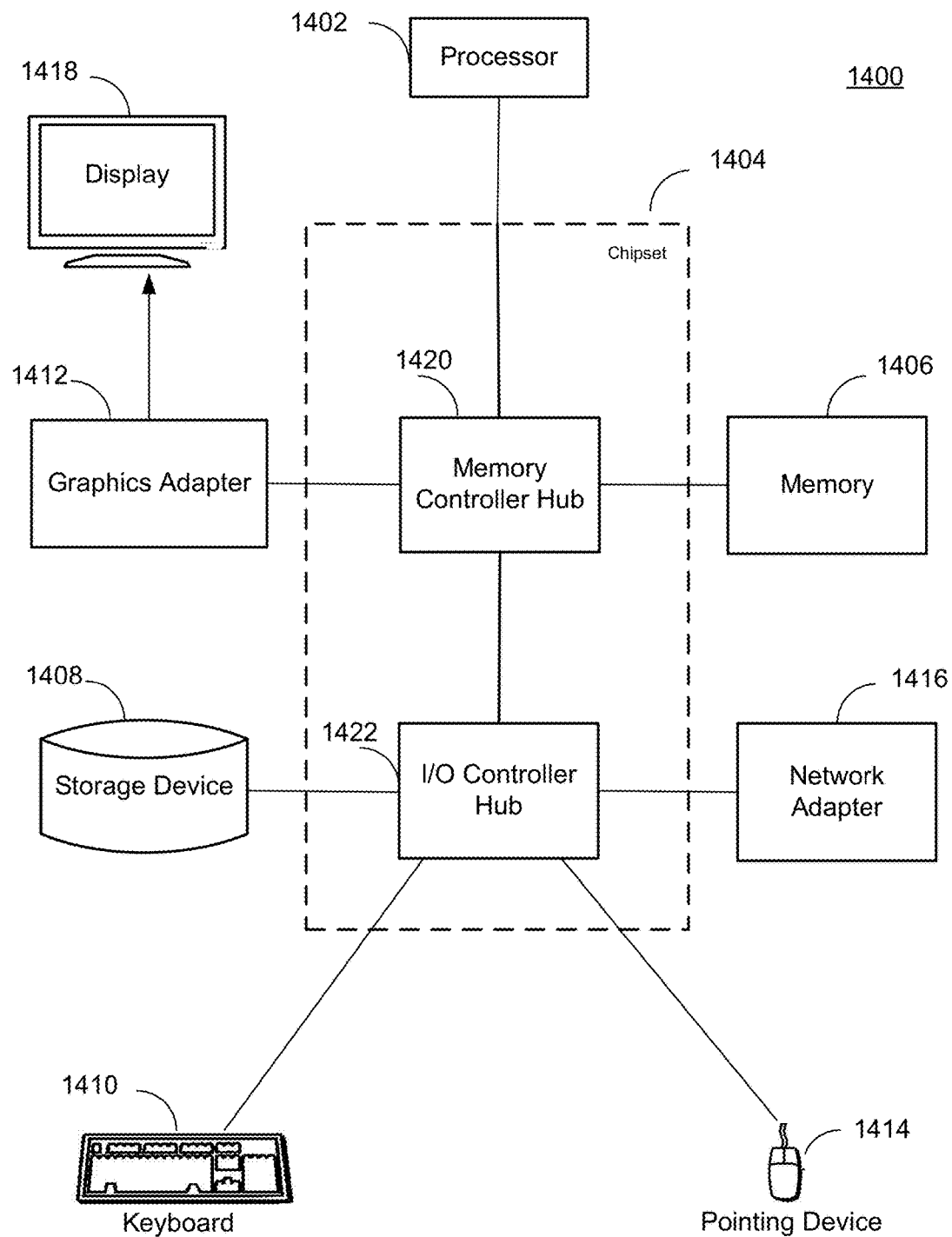
FIG. 14 is a high-level block diagram illustrating an example of a computer for use as a system for performing formal verification with low power considerations, in accordance with an embodiment.

FIG. 13 shows an interaction diagram illustrating the processing of DDFs based on instructions received in multiple languages, according to an embodiment. The distributed data framework 200 receives instructions in different languages from documents edited by users via client devices 130. The instructions are received by the in-memory cluster computing engine 220 and sent to each compute node that stores a DDF segment of the DDF being processed by the instructions. In other embodiments, there may be different components/modules involved in the processing (different from those shown in FIG. 13). Also, there is a primary runtime 1120 and a secondary runtime 1220 on each compute node on which a DDF segment of the DDF being processed is stored.

The client device 130 sends 1310 instructions in the primary language to the primary runtime 1120 of each compute node storing a DDF segment 1110. The primary runtime 1120 receives the instructions in the primary language from the client device 130 and processes 1315 them using the DDF segment. The primary runtime 1120 sends 1320 the results back to the client device 130. Note that the results may be sent via different software modules, for example, the primary runtime 1120 may send the results to the in-memory cluster engine 220, the in-memory cluster computing engine 220 may send the results to the analytics framework 230 which in turn may send the results to the client device 130. For simplicity, the client device 130 is shown interacting with the primary runtime 1120. The processing 1315 of the instructions may cause the DDF to mutate such that subsequent instructions process the mutated DDF.

The client 130 subsequently sends 1325 instructions in the secondary language 1325. For example, the instructions may include a call to a built-in function that is implemented in the secondary language and not in the primary language. The primary runtime 1120 transforms 1330 the DDF segment stored in the compute node of the primary runtime 1120 to a transformed DDF segment that conforms to the secondary language. The primary runtime 1120 sends 1335 the transformed DDF segment to the secondary runtime 1220.

The secondary runtime 1220 processes 1340 the instructions in the secondary language using the transformed DDF segment. The processing 1340 may generate a result DDF. The result DDF may be a new DDF segment generated by processing 1340 the instructions. Alternatively the result DDF segment may be a mutated form of the input DDF segment.

The secondary runtime 1220 transforms the result DDF to a format that conforms to the primary language. The secondary runtime 1220 sends 1350 the transformed result DDF to the primary runtime 1120. The primary runtime 1120 stores the transformed result for further processing, for example, if subsequent instructions based on the result DDF are received. The primary runtime 1120 sends 1335 any results based on the processing 1340 to the client device (for example, any result code, aggregate values, and so on).

As shown in FIG. 13, the client device 130 sends 1360 further instructions in primary language for processing using the result DDF. The primary runtime 1120 processes 1365 the received instructions using the result DDF. The primary runtime 1120 sends 1370 any results based on the processing 1365 back to the client device 130.

The distributed data framework 200 runtime automatically select the best representation of data for in-memory storage and algorithm execution without user's involvement. By default, a compressed columnar data format is used which is optimized for analytic queries and univariate statistical analysis. When a machine learning algorithm is invoked, the distributed data framework 200 performs conversion that is optimized for such algorithm, e.g. in a linear regression command, a conversion is performed by the distributed data framework 200 to extract values from selected columns and build a matrix representation. The distributed data framework 200 caches the matrix representation in memory for the iterative machine learning process.

The distributed data framework 200 deletes the matrix representation from the cache (i.e., uncaches) the matrix representation when the algorithm is finished.

The distributed data framework 200 provides an extensible framework for providing support for different programming languages. The distributed data framework 200 receives from a user, software modules for performing conversions of data values conforming to format of one language to format of a new language. The distributed data framework 200 further receives code for runtime of the new language. The distributed data framework 200 allows code blocks to be specified using the new language. As a result the distributed data framework 200 can be easily extended with support for new languages without requiring modifications to the code for existing languages.

ALTERNATIVE EMBODIMENTS

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for providing multi-language support for data processing, the method comprising:

storing an in-memory distributed data frame structure (DDF) across a plurality of compute nodes, each compute node storing a portion of the in-memory distributed data structure (DDF segment), each runtime from a first set of runtimes of the plurality of compute nodes configured to process instructions of a primary language, each runtime from a second set of runtimes of the plurality of compute nodes configured to process instructions of a secondary language;

maintaining a representation of a document comprising text and code blocks, the code blocks comprising a first code block for providing first instructions using the primary language and a second code block for providing second instructions using the secondary language, the first and second instructions for processing data of the DDF;

receiving a request to process the first instructions specified in the first code block using the primary language;

processing, for each compute node by a corresponding runtime of the first set of runtimes, the first instructions using the primary language to process the DDF segment mapped to the compute node to conform to a first data structure format of the primary language;

receiving a request to process the second instructions specified in the second code block using the secondary language;

transforming, for each compute node by a corresponding runtime of the first set of runtimes, data of the DDF segment mapped to the compute node from the first data structure format to conform to a second data structure format of the secondary language;

executing, by the second set of runtimes, the second instructions using the secondary language to generate a result DDF segment conforming to the second data structure format of the secondary language, the result DDF segment generated by applying a feature supported by the secondary language to the DDF segments;

transforming, by the second set of runtimes, data of the result DDF segment from the second data structure format to conform to the first data structure format of the primary language; and processing, for each compute node by a corresponding runtime of the first set of runtimes, further instructions specified using the primary language to process the transformed result DDF segment mapped to the compute node.

2. The method of claim 1, wherein the document is shared across a plurality of user accounts, wherein the first instructions for the first code block are received from a first user account and the second instructions for the second code block are received from a second user account.

3. The method of claim 1, wherein the primary language is JAVA and the secondary language is one of PYTHON or R language.

4. The method of claim 1, further comprising:
processing, by each compute node, data of the DDF segment mapped to the compute node, the processing comprising:
determining whether a stored value of the data of the DDF segment represents a special data value of the primary language; and
responsive to determining that the data of the DDF segment stores a special data value of the primary language, converting the stored value to a different special data value of the secondary language.

5. The method of claim 1, wherein the result DDF segment is a new DDF segment generated based on the DDF segments.

6. The method of claim 1, wherein the result DDF segment is a modified version of one or more of the DDF segments.

7. A computer readable non-transitory storage medium, storing instructions for:
storing an in-memory distributed data frame structure (DDF) across a plurality of compute nodes, each compute node storing a portion of the in-memory distributed data structure (DDF segment), each runtime from a first set of runtimes of the plurality of compute nodes configured to process instructions of a primary language, each runtime from a second set of runtimes of the plurality of compute nodes configured to process instructions of a secondary language;
maintaining a representation of a document comprising text and code blocks, the code blocks comprising a first code block for providing first instructions using the primary language and a second code block for providing second instructions using the secondary language, the first and second instructions for processing data of the DDF;
receiving a request to process the first instructions specified in the first code block using the primary language;
processing, for each compute node by a corresponding runtime of the first set of runtimes, the first instructions using the primary language to process the DDF segment mapped to the compute node to conform to a first data structure format of the primary language;

receiving a request to process the second instructions specified in the second code block using the secondary language;

transforming, for each compute node by a corresponding runtime of the first set of runtimes, data of the DDF segment mapped to the compute node from the first data structure format to conform to a second data structure format of the secondary language;

executing, by the second set of runtimes, the second instructions using the secondary language to generate a result DDF segment conforming to the second data structure format of the secondary language, the result DDF segment generated by applying a feature supported by the secondary language to the DDF segments;

transforming, by the second set of runtimes, data of the result DDF segment from the second data structure format to conform to the first data structure format of the primary language; and processing, for each compute node by a corresponding runtime of the first set of runtimes, further instructions specified using the primary language to process the transformed result DDF segment mapped to the compute node.

8. The computer readable non-transitory storage medium of claim 7, wherein the document is shared across a plurality of user accounts, wherein the first instructions for the first code block are received from a first user account and the second instructions for the second code block are received from a second user account.

9. The computer readable non-transitory storage medium of claim 7, wherein the primary language is JAVA and the secondary language is one of PYTHON or R language.

10. The computer readable non-transitory storage medium of claim 7, further storing instructions for:
processing, by each compute node, data of the DDF segment mapped to the compute node, the processing comprising:
determining whether a stored value of the data of the DDF segment represents a special data value of the primary language; and
responsive to determining that the data of the DDF segment stores a special data value of the primary language, converting the stored value to a different special data value of the secondary language.

11. The computer readable non-transitory storage medium of claim 7, wherein the result DDF segment is one of: a new DDF segment generated based on the DDF segments or a modified version of one or more of the DDF segments.

12. A computer-implemented system for processing of distributed data structures, the system comprising:
a computer processor; and
a computer readable non-transitory storage medium storing instructions thereon, the instructions when executed by a processor cause the processor to perform the steps of:
storing an in-memory distributed data frame structure (DDF) across a plurality of compute nodes, each compute node storing a portion of the in-memory distributed data structure (DDF segment), each runtime from a first set of runtimes of the plurality of compute nodes configured to process instructions of a primary language, each runtime from a second set of runtimes of the plurality of compute nodes configured to process instructions of a secondary language;

maintaining a representation of a document comprising text and code blocks, the code blocks comprising a first code block for providing first instructions using the primary language and a second code block for providing second instructions using the secondary language, the first and second instructions for processing data of the DDF;

receiving a request to process the first instructions specified in the first code block using the primary language;

processing, for each compute node by a corresponding runtime of the first set of runtimes, the first instructions using the primary language to process the DDF segment mapped to the compute node to conform to a first data structure format of the primary language;

receiving a request to process the second instructions specified in the second code block using the secondary language;

transforming, for each compute node by a corresponding runtime of the first set of runtimes, data of the DDF segment mapped to the compute node from the first data structure format to conform to a second data structure format of the secondary language;

executing, by the second set of runtimes, the second instructions using the secondary language to generate a result DDF segment conforming to the second data structure format of the secondary language the result DDF segment generated by applying a feature supported by the secondary language to the DDF segments;

transforming, by the second set of runtimes, data of the result DDF segment from the second data structure format to conform to the first data structure format of the primary language; and processing, for each compute node by a corresponding runtime of the first set of runtimes, further instructions specified using the primary language to process the transformed result DDF segment mapped to the compute node.

13. The computer-implemented system of claim 12, wherein the computer readable non-transitory storage medium of claim 7 further stores instructions for:

processing, by each compute node, data of the DDF segment mapped to the compute node, the processing comprising:

determining whether a stored value of the data of the DDF segment represents a special data value of the primary language; and responsive to determining that the data of the DDF segment stores a special data value of the primary language, converting the stored value to a different special data value of the secondary language.

14. The computer-implemented system of claim 12, wherein transforming the data of the DDF segment mapped to the compute node from the first data structure format to conform to the second data structure format of the secondary language comprises:

converting a list of byte buffers to a list of vectors.

15. The computer-implemented system of claim 12, wherein transforming the data of the DDF segment mapped to the compute node from the first data structure format to conform to the second data structure format of the secondary language comprises:

converting a floating point not-a-number value to a null pointer.

16. The method of claim 1, wherein transforming the data of the DDF segment mapped to the compute node from the first data structure format to conform to the second data structure format of the secondary language comprises:

converting a list of byte buffers to a list of vectors.

17. The method of claim 1, wherein transforming the data of the DDF segment mapped to the compute node from the first data structure format to conform to the second data structure format of the secondary language comprises:

converting a floating point not-a-number value to a null pointer.

18. The computer readable non-transitory storage medium of claim 7, wherein transforming the data of the DDF segment mapped to the compute node from the first data structure format to conform to the second data structure format of the secondary language comprises:

converting a list of byte buffers to a list of vectors.

19. The computer readable non-transitory storage medium of claim 7, wherein transforming the data of the DDF segment mapped to the compute node from the first data structure format to conform to the second data structure format of the secondary language comprises:

converting a floating point not-a-number value to a null pointer.

* * * * *